(12) United States Patent
Duke et al.

(10) Patent No.: US 11,858,121 B2
(45) Date of Patent: Jan. 2, 2024

(54) ROBOTS FOR GAS LEAK INSPECTION

(71) Applicant: MFE Enterprises, Inc., Dripping Springs, TX (US)

(72) Inventors: Dylan Duke, Dripping Springs, TX (US); Jason Acerbi, Dripping Springs, TX (US)

(73) Assignee: MFE Enterprises, Inc., Dripping Springs, TX (US)

(*) Notice: Subject to any disclaimer, the term of this patent is extended or adjusted under 35 U.S.C. 154(b) by 143 days.

(21) Appl. No.: 17/400,018

(22) Filed: Aug. 11, 2021

(65) Prior Publication Data
US 2023/0008829 A1 Jan. 12, 2023

Related U.S. Application Data

(60) Provisional application No. 63/219,279, filed on Jul. 7, 2021.

(51) Int. Cl.
*G05D 1/00* (2006.01)
*B25J 13/08* (2006.01)
(Continued)

(52) U.S. Cl.
CPC .......... *B25J 13/087* (2013.01); *B25J 9/1664* (2013.01); *B25J 9/1674* (2013.01); *B25J 9/1697* (2013.01);
(Continued)

(58) Field of Classification Search
CPC ...... B25J 13/087; B25J 9/1664; B25J 9/1674; B25J 9/1697; B25J 19/023; B25J 9/163;
(Continued)

(56) References Cited

U.S. PATENT DOCUMENTS

2018/0129212 A1 5/2018 Lee et al.
2019/0242728 A1 8/2019 Low et al.
(Continued)

FOREIGN PATENT DOCUMENTS

CN 106239505 A 12/2016
CN 111633660 A 9/2020
(Continued)

OTHER PUBLICATIONS

Bouwmans et al., "Background Modeling using Mixture of Gaussians for Foreground Detection—A Survey," Recent Patents on Computer Science, vol. 1, No. 3, 2008, pp. 219-237(19).
(Continued)

*Primary Examiner* — Robert T Nguyen
(74) *Attorney, Agent, or Firm* — Pillsbury Winthrop Shaw Pittman LLP

(57) ABSTRACT

Robots and sensor systems may be used to inspect facilities or other infrastructure and detect gas leaks. A process may include obtaining path information indicating a path for the robot to travel, and locations along the path to inspect with the sensor system. The robot may move along the path and may determine, based on information received via a location sensor, that the robot is at a first location of the locations indicated by the path information. In response to determining that the robot is at the first location, the robot may adjust the sensor system based on first orientation information associated with the first location. An image or video may be recorded via the sensor system.

22 Claims, 9 Drawing Sheets

(51) Int. Cl.
*B25J 19/02* (2006.01)
*B25J 9/16* (2006.01)
*G06F 16/95* (2019.01)
*G06F 16/532* (2019.01)
*G06N 3/08* (2023.01)

(52) U.S. Cl.
CPC .......... *B25J 19/023* (2013.01); *G05D 1/0094* (2013.01); *G06F 16/532* (2019.01); *G06F 16/95* (2019.01); *G06N 3/08* (2013.01)

(58) Field of Classification Search
CPC ........ G06F 16/532; G06F 16/95; G06F 16/55; G06N 3/08; G05D 1/0094
See application file for complete search history.

(56) References Cited

U.S. PATENT DOCUMENTS

| | | |
|---|---|---|
| 2020/0182779 A1 | 6/2020 | Kasten et al. |
| 2020/0320659 A1 | 10/2020 | Whiting et al. |
| 2021/0200239 A1 | 7/2021 | Chae |
| 2022/0244127 A1* | 8/2022 | Aubrey .................. G01M 3/04 |

FOREIGN PATENT DOCUMENTS

| | | |
|---|---|---|
| JP | 2019027899 A | 2/2019 |
| WO | 2022093862 A1 | 5/2022 |

OTHER PUBLICATIONS

O'Neill et al. "Understanding Cooled vs. Uncooled Optical Gas Imaging," Teledyne Flir,2. https://www.flir.com/discover/instruments/gas-detection/understanding-cooled-vs-uncooled-optical-gas-imaging/ Feb. 28, 2019.
Internet Archive of https://dev.bostondynamics.com/docs/concepts/readme "Concepts" captured Jun. 26, 2021.
Internet Archive of https://dev.bostondynamics.com/docs/concepts/networking "Networking" captured Jun. 26, 2021.
Internet Archive of https://dev.bostondynamics.com/docs/concepts/robot_services "Robot Services" captured Jun. 26, 2021.
Internet Archive of https://dev.bostondynamics.com/docs/concepts/geometry_and_frames "Geometry and Frames" captured Jun. 26, 2021.
Internet Archive of https://dev.bostondynamics.com/docs/concepts/developing_api_services "Developing API Services" captured Jun. 26, 2021.
Rosebrock, Adrian, "Siamese networks with Keras, TensorFlow, and Deep Learning," https://www.pyimagesearch.com/2020/11/30/siamese-networks-with-keras-tensorflow-and-deep-learning/ dated Nov. 30, 2020.
Rosebrock, Adrian, "Building image pairs for siamese networks with Python," ttps://www.pyimagesearch.com/2020/11/23/building-image-pairs-for-siamese-networks-with-python/ dated Nov. 23, 2020.
Hanif, Maheen, "Boston Dynamics Dog Robot 'Spot' Has Been Employed by Norwegian Oil Company to Detect Gas Leaks," RumbleRum, Mar. 22, 2020, https://www.rumblerum.com/boston-dynamics-robot-dog-spot-norwegian-oil-company-gas-leaks/, 2 pages.
The Editorial Team, "BP deploys robot on offshore oil rig to enhance safety," Safety4Sea, Nov. 16, 2020, https://safety4sea.com/bp-deploys-robot-on-offshore-oil-rig-to-enhance-safety/, 3 pages.
Thomas, Allister, "BP shares video of robot dog 'Spot' on oil platform," Energy Voice, Nov. 17, 2020, https://www.energyvoice.com/oilandgas/279373/bp-video-robot-dog-oil-platform/, 3 pages.
Born to Engineer, "Boston Dynamics 'Spot' Heading to Sea," Feb. 2020, https://www.borntoengineer.com/boston-dynamics-oil-rig, 6 pages.
AIT News Desk, "Aker BP and Cognite Pioneer Robotics Deployment Offshore to Transform Oil and Gas Industry with Autonomous Mission," AIThority, Nov. 30, 2020, https://aithority.com/saas/aker-bp-and-cognite-pioneer-robotics-deployment-offshore-to-transform-oil-and-gas-industry-with-autonomous-mission/, 7 pages.
Non-Final Office Action for related U.S. Appl. No. 17/400,026 dated Jun. 2, 2023, 43 pages.

* cited by examiner

ROBOTS FOR GAS LEAK INSPECTION

CROSS-REFERENCE TO RELATED APPLICATIONS

The present patent-filing claims the benefit of U.S. provisional patent application 63/219,279, titled "Robots for Gas Leak Inspection," and filed on Jul. 7, 2021. The entire content of each afore-mentioned patent-filing is hereby incorporated by reference.

BACKGROUND

Some facilities may process various types of gasses, such as natural gas. For example, an oil or natural gas well site may extract gas from the earth, a central tank battery may be used to store oil or gas, and a compressor station may assist with the transportation process of natural gas from one location to another, in some cases by liquification or in some cases via pipelines without liquification. In other examples, a refinery may transform various byproducts of oil into a gaseous state, e.g., using fractional distillation to extract petroleum naphtha, gasoline, diesel fuel, asphalt base, heating oil, kerosene, liquefied petroleum gas, jet fuel and fuel oils.

SUMMARY

Robots and sensor systems may be used to inspect facilities or other infrastructure and detect gas leaks. A process may include obtaining inspection path information indicating a path for the robot to travel, and locations along the path to inspect with the sensor system. Each location may be associated with orientation information indicating an orientation that the robot or a sensor system attached to the robot, should be placed in to record one or more images. The robot may move along the path and may determine, based on information received via location sensor, that the robot is at a first location of the locations indicated by the path information. In response to determining that the robot is at the first location, the robot may adjust the sensor system based on first orientation information associated with the first location. The sensor system may receive an indication that an orientation of the sensor system matches the first orientation information. In response to receiving the indication that the orientation of the sensor system matches the first orientation information, an image or video may be recorded via the sensor system. The image or video may be stored in memory.

Some aspects include a process including: receiving inspection path information indicating a path for a robot to travel, and a plurality of locations along the path to inspect with a sensor system; determining, based on information received via the location sensor, that a distance between a location of the robot and a first location of the plurality of locations is greater than a threshold distance; in response to determining that the distance is greater than the threshold distance, sending a first command to the sensor system, wherein the first command causes a refrigeration system of an optical gas imaging (OGI) camera to decrease cooling; moving along the path; in response to determining that the robot is at a first location of the plurality of locations, sending a second command to the sensor system, wherein the second command causes the refrigeration system of the OGI camera to increase cooling; causing the sensor system to record a first video with an OGI camera; and causing the sensor system to store the first video in memory.

Some aspects include a process including: obtaining a first set of one or more images generated via an optical gas imaging (OGI) camera and a second set of one or more images generated via a second camera, wherein the first set and the second set correspond to a first location of a plurality of locations in a facility; classifying, via a convolutional neural network (CNN), the first set of one or more images according to whether the one or more images depict a gas leak; and storing a result of classifying the first set in memory.

Some aspects include a tangible non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

DETAILED DESCRIPTION

Figure 1:
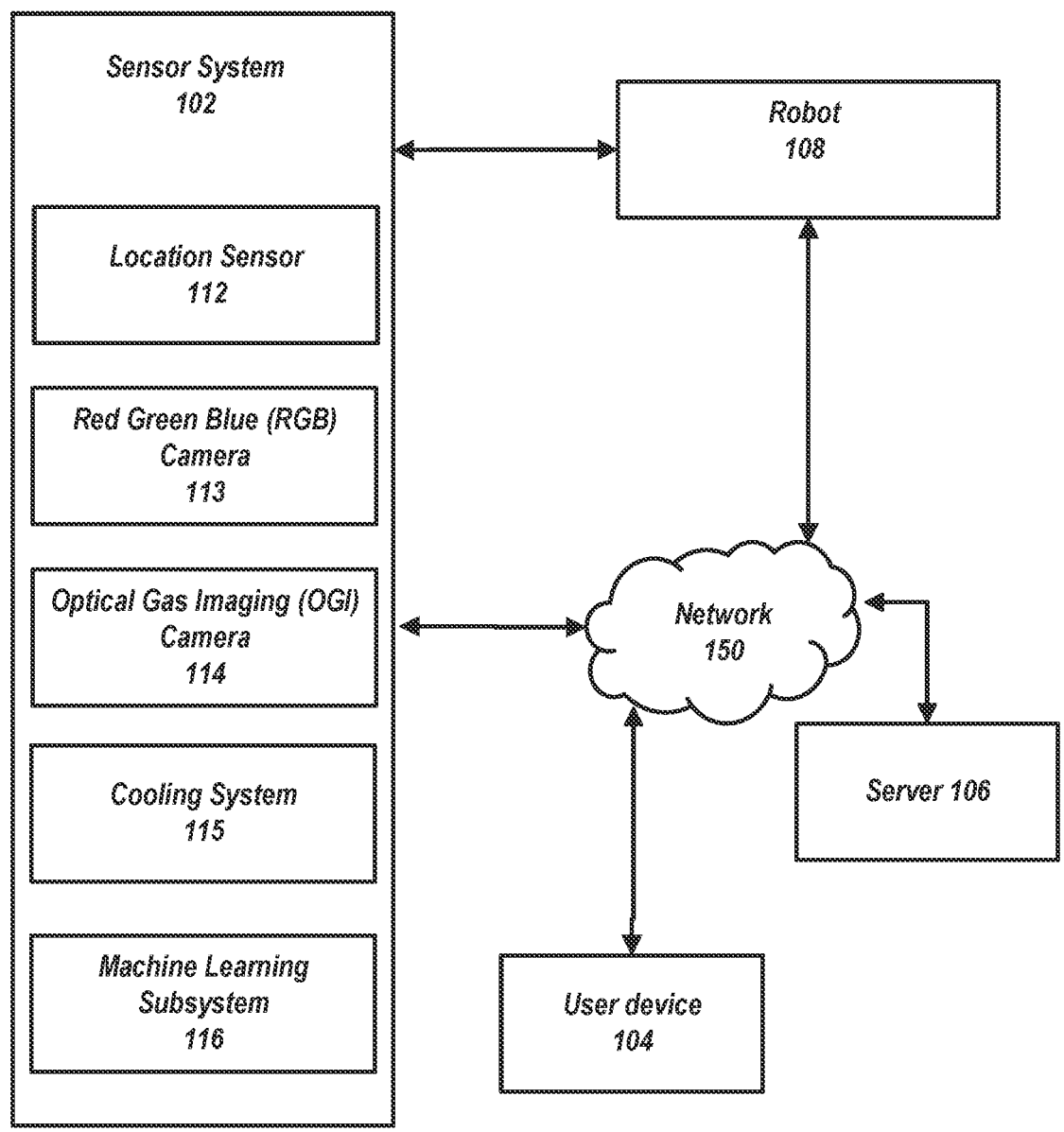
FIG. 1 shows an example computing system for gas leak inspection, in accordance with some embodiments.

In the following description, for the purposes of explanation, numerous specific details are set forth in order to provide a thorough understanding of the disclosure. It will be appreciated, however, by those of ordinary skill in the art, that the disclosed techniques may be practiced without these specific details or with an equivalent arrangement. To mitigate the problems described herein, the inventors had to both invent solutions and, in some cases just as importantly, recognize problems overlooked (or not yet foreseen) by others in the fields of robotics, and computer vision, electrical engineering, and machine learning. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Many robots are not well suited to detect leaks at gas processing facilities. They often lack the appropriate sensor suite, as many robot-mounted cameras cannot detect gas that, in the visual spectrum, is often transparent. Further, such robots often generate excessive heat that impairs the operation of sensors suitable for detecting leaks, and many robotic imaging systems capture large amounts of video data without regard to whether those videos depict the types of features of interest in gas leak detection, leaving users with large volumes of video data to wade through after the fact. None of which is to suggest that any techniques are disclaimed.

To mitigate some or all of these problems, in some embodiments, a robot may use a sensor system to inspect for gas leaks. The sensor system may obtain path information (e.g., inspection path information) that indicates a path for the robot to travel. The path information may indicate locations along the path to inspect with the sensor system, or in some cases, the robot may be configured to detect potential leaks in the field and determine to inspect at a location on the fly. Each location may be associated with information indicating a particular view of the location that is to be captured via one or more robot-mounted cameras. For example, the path information may indicate the location of a pipe fitting (e.g., a first location) and a tank (e.g., a second location) within a facility that is to be inspected using the sensor system. The information may include orientation information indicating a pose (e.g., position and orientation) that a red green blue (RGB) camera and an OGI camera should be placed in to record an image (e.g., or video) of each location. The information may indicate a distance (e.g., a minimum distance, target distance, or a maximum distance) from an object to move to record an image. The robot may move along the path or move to a starting location of the path, for example, in response to obtaining the path information. The robot may move autonomously. For example, after receiving input to move along a path, the robot may move to each location on the path without further input from a user. The robot may move with assistance from a teleoperator. The teleoperator may input commands to the robot and the robot may move between locations in the path based on the input.

The sensor system 102 may determine (e.g., based on information received via the location sensor 112), that the robot 108 is at a location of the plurality of locations indicated by the path information. For example, a location sensor of the robot may match the first location (e.g., a pipe at a facility) indicated by the path information. In response to determining that the robot is at the first location, the sensor system 102 may adjust the OGI camera based on first orientation information associated with the first location. For example, the sensor system 102 may rotate to a position that allows the pipe to be captured in a view of the camera. Additionally or alternatively, the sensor system 102 may adjust a zoom or other camera setting of a camera.

The sensor system may receive an indication that the orientation of the camera matches the orientation information for the location. For example, the robot may use an actuator to adjust the position of the sensor system to allow an object to be within a field of view of a camera of the sensor system. After adjusting the sensor system, the robot may send a message to the sensor system indicating that the sensor is in the appropriate orientation for the first location. The sensor system may record video or images with a camera (e.g., an RGB camera, an OGI camera, a thermal imaging camera, etc.), for example, in response to receiving the indication that the orientation of the OGI camera matches the orientation information for the location. Or in some cases, video may be recorded continuously, and sections of video may be flagged as relevant in response to such an indication. The sensor system or robot may store the recorded video or images in memory before sending the first video and the second video to a server.

FIG. 1 shows an example robot system 100 for detection of gas leaks. The robot system 100 may include a sensor system 102, a user device 104, a server 106, or a robot 108. The sensor system 102 may include a location sensor 112, a red green blue (RGB) camera 113, an optical gas imaging (OGI) camera 114, a cooling system 115, or a machine learning (ML) subsystem 116. The sensor system 102, robot 108, server 106, and user device 104 may communicate via the network 150. The RGB camera 113 and the OGI camera 114 may be located in the sensor system 102 such that the field of view of the RGB camera 113 and the field of view of the OGI camera 114 overlap. For example, the field of view of the RGB camera 113 may encompass the field of view of the OGI camera 114. The RGB camera may include or be a variety of different color cameras (e.g., RGB cameras may include RYB and RYYB cameras), and the term "RGB camera" should not be read as limited to color cameras that include only or all of red, blue, and green channel sensors, e.g., for the present purposes, a RYYB camera should be understood to be a type of RGB camera. The cooling system 115 may include an air circulation fan, a liquid cooling system, or a variety of other cooling systems.

In some embodiments, the robot 108 may avoid one or more locations based on permissions associated with a user that is logged into the robot 108. Various users may be able to log into the robot 108 to monitor the robot's progress. One or more locations may be restricted from viewing by one or more users. The robot 108 may obtain information (e.g., a user identification, IP address, MAC address, etc.) indicating a user that is logged into the robot 108 or the sensor system 102. The robot 108 or sensor system 102 may determine or obtain location permissions associated with the user. For example, the location permissions may be received from the server 106. The robot 108 may cause, based on the location permissions associated with the user, the robot to skip one or more locations of the plurality of locations. For example, the robot 108 may determine (e.g., based on the location permissions) that the user logged in is restricted from the second location indicated in the path information. After completing inspection of the first location, the robot 108 may skip the second location and continue to the third location, for example, in response to determining that the user is restricted from the second location.

The robot 108, or a remote server, may control one or more components of the sensor system 102. The robot 108 may determine to turn down (e.g., decrease cooling, or turn off) the cooling system 115, for example, if (e.g., in response to determining that) the OGI camera 114 is not in use. The cooling system 115 may be used to keep the sensor system 102 below a threshold temperature, for example, so that the sensor system 102 may use one or more cameras, communicate with the robot 108, or perform other functions described herein. The cooling system 115 may be used to maintain the OGI camera 114 below a threshold temperature to reduce noise detected by a sensor of the OGI camera 114 below that of the signal from the scene being imaged. The OGI camera 114 may use a spectral filter method that enables it to detect a gas compound. The spectral filter may be mounted in front of a detector of the OGI camera 114. The detector or filter may be cooled to prevent or reduce radiation exchange between the filter and the detector. The filter may restrict the wavelengths of radiation that pass through to the detector (e.g., via spectral adaptation). For example, the filter may restrict wavelengths outside the range of 3-5 micrometers from reaching the detector.

The robot 108 may turn off one or more components of the sensor system 102, for example, while traveling between locations indicated in the path information. The robot 108 may determine that a distance to a location satisfies a threshold (e.g., is greater than a threshold distance). In response to determining that the distance is greater than the threshold distance, the robot 108 may send a command to the sensor system 102. The command may cause the cooling system 115 (e.g., or a compressor associated with the cooling system 115) of the OGI camera 114 to turn off. The robot 108 may move along the path and in response to determining that the robot 108 is at a location (e.g., or is within a threshold distance of a location) of the plurality of locations, may send a second command to the sensor system 102. The second command may cause the cooling system 115 (e.g., or a compressor associated with the cooling system 115) of the OGI camera 114 to turn on, or some embodiments may modulate an intensity of cooling in cooling systems that support a continuous range of cooling intensities. In some embodiments, the robot 108 may cause the sensor system 102 to turn off the location sensor 112, cameras 113-114, or cooling system 115 (e.g., or a compressor of the cooling system 115) while the robot 108 is docked at a charging station. The robot 108 may determine that the robot 108 is charging a power source. In response to determining that the robot 108 is charging the power source, the robot 108 may cause the sensor system 102 to turn off the cooling system 115.

In some embodiments, the robot 108 may cause the cooling system 115 to turn up (e.g., to decrease the temperature) or turn on, for example, even when one or more cameras 113-114 are not in use. The robot 108 may receive (e.g., from the sensor system 102), an indication that a temperature within the sensor system 102 is above a threshold temperature. In response to receiving the indication that a temperature within the sensor system 102 is above a threshold temperature, the robot 108 may cause the cooling system to turn on or adjust a temperature of the sensor system 102. Alternatively, the sensor system 102 may monitor its internal temperature and may cause the cooling system 115 to turn off or on as needed.

Additionally or alternatively, the robot 108 may search for a cool location (e.g., away from the sun, more than a threshold distance away from one or more heat generating objects in a facility, etc.) to wait, for example, in response to receiving the indication that a temperature within the sensor system 102 is above the threshold temperature. The robot 108 may determine a shady location to wait. The robot 108 may record one or more images of an environment surrounding the robot and may determine a shady location based on pixel intensities, contrast, or other factors. Additionally or alternatively, the robot 108 may determine, based on inputting a portion of the one or more images into a machine learning model, a first location within the environment that receives less sunlight than a second location within the environment. The robot 108 may move to the first location, and may cause the cooling system 115 to run, for example, until a temperature of the sensor system 102 is below the threshold temperature.

The cooling system 115 or a compressor of the cooling system 115 may be configured to cool a sensor of the OGI camera 114. For example, the cooling system 115 may be able to cool a sensor of the OGI camera 114 to below 78 degrees Kelvin. The sensor of the OGI camera 114 may include an infrared detector and a spectral filter. The spectral filter may prevent light outside a range of 3-5 micrometers from reaching the infrared detector. The cooling system 115 may include a Peltier system (e.g., with a thermoelectric cooler that cools by causing direct current to flow through a semiconductor of the cooling system) or a refrigeration cycle cooling system (e.g., with refrigerant, a compressor, and a condenser).

The sensor system 102 and robot 108 may periodically send messages (e.g., heartbeat messages) or status updates to each other. The messages may indicate battery levels of the sensor system 102 or robot 108, or other indications such as error messages. In some embodiments, the robot 108 may determine that more than a threshold amount of time (e.g., 5 seconds, 30 seconds, 5 minutes, 30 minutes, etc.) has transpired since receiving a message (e.g., heartbeat message) from the sensor system 102. In response to determining that more than a threshold amount of time has transpired, the robot 108 may move to a charging station associated with the robot 108. Additionally or alternatively, the robot 108 may (e.g., in response to determining that more than a threshold amount of time has transpired) send a request to the server 106. The request may indicate a diagnostic procedure for the server 106 to perform on the sensor system 102. For example, the server 106 may cause the sensor system 102 to reboot or reboot one or more components (e.g., the cooling system, etc.). Additionally or alternatively, the robot 108 may, in response to determining that more than a threshold amount of time has transpired since receiving a heartbeat message from the sensor system 102, cause a power source of the robot to charge a power source (e.g., a battery) of the sensor system 102 or cause the sensor system 102 to reboot.

The robot 108 or sensor system 102 may determine (e.g., based on information received via the location sensor), that the robot 108 is at a location of the plurality of locations indicated in the path information. For example, a location sensor of the robot 108 may match the first location (e.g., a pipe, a tank, or other location) indicated in the path information. In some embodiments, the location sensor may allow triangulation with on-site beacons, may detect magnets (e.g., implanted in the floor, ceiling, walls, etc.), optical codes (e.g., aprilTags, ArUco markers, bar codes, etc.) positioned in the facility, may use satellite navigation (e.g., Galileo, Global Navigation Satellite System, Global Positioning System, etc.). In some embodiments, the robot 108 may be in a facility (e.g., a factory, other building, etc.) where the robot 108 or sensor system 102 are unable to receive GPS signals. The robot 108 may use simultaneous localization and mapping (SLAM) techniques to determine whether the robot 108 is at a location indicated by the path information, for example, if the robot 108 is unable to receive GPS signals. Some embodiments may navigate without building a 3D map of the environment (e.g., without SLAM), for example by representing the world as a locally consistent graph of waypoints and edges. In some embodiments, the sensor system 102 may include a location sensor or the robot 108 may include a location sensor. A location sensor may be implemented with visual sensing (e.g., via a camera). A location sensor may be implemented without sensing GPS signals or wireless beacons, or some embodiments may use these signals in addition to other location sensors.

In some locations or facilities, the robot 108 may be unable to detect GPS or other wireless communication and may rely on visual SLAM, radar, or lidar systems to navigate the facility. the sensor system 102 or the robot 108 may store one or more maps (e.g., one or more electronic maps) associated with a facility. A map may be learned by the robot 108 or sensor system 102 via SLAM techniques (e.g., particle filter, extended Kalman filter, GraphSLAM, etc.). The maps may correspond to different configurations that the facility may be in. For example, some facilities may have a first configuration (e.g., layout of different objects) for one time period (e.g., winter season) and a second configuration for a different portion of the year (e.g., summer season). The sensor system 102 or robot 108 may use a map corresponding to the layout to assist in navigating the facility to perform an inspection. The path information may be indicated by the map. The map may indicate the locations of one or more aspects of a facility (e.g., location of stairs, pipes, boilers, storage tanks, or a variety of other objects).

In some embodiments, the robot 108 may begin using a first map to navigate, determine that it is unable to recognize its surroundings, and in response may obtain or begin using a different map. For example, the sensor system 102 or server 106 may receive, from the robot 108, navigation information indicating that the robot 108 is lost. The navigation information may be generated based on a determination that an environment (e.g., one or more objects in a facility) surrounding the robot 108 does not match information indicated by the first map. The navigation information may include one or more images of the environment surrounding the robot 108, or the last known location of the robot 108. In response to receiving the navigation information, the server 106 or the sensor system 102 may send a second map (e.g., a second map that is determined to match the navigation information received from the robot 108). The second map may include an indication of each location of the plurality of locations. In some embodiments, it may be determined that a map that matches the environment surrounding the robot 108 does not exist or cannot be obtained. In response to determining that the map cannot be obtained, the robot 108 may generate a map of the environment (e.g., via SLAM techniques).

In response to determining that the robot 108 is at the location indicated by the path information, the robot may adjust the OGI camera 114 based on orientation information associated with the location. For example, the sensor system 102 may rotate to a position that allows an object (e.g., a pipe, storage tank, etc.) to be captured in a view of the cameras 113-114. In response to determining that the robot 108 is at the location, the sensor system 102 may adjust one or more other settings of the sensor system 102. The one or more other settings may include zoom, flash (or persistent onboard illumination), or other settings of the OGI camera 114 or the RGB camera 113. For example, at a first location the sensor system 102 may zoom in 10X if indicated by the path information. Additionally or alternatively, the sensor system 102 may determine an adjustment to be made based on the orientation (e.g., pose) of the robot 108. The adjustment may allow a region of interest at the first location to be captured within a field of view of a camera (e.g., camera 113, camera 114, etc.) of the sensor system 102. For example, to take a picture of a particular pipe, the sensor system 102 may need to be adjusted depending on whether the robot 108 is facing the pipe or facing a different direction. As an additional example, the sensor system 102 may be rotated to point upwards to view a location above the robot 108. In some embodiments, the orientation information may include a vector indicating a roll of the robot, a pitch of the robot, and a yaw of the robot. The robot 108 may adjust its position to match the indicated roll, pitch, and yaw.

The sensor system 102 may send a request (e.g., to the robot 108 or the server 106) for position information associated with the robot 108. The position information may include pose information indicating the position and orientation of a coordinate frame of the robot 108. The pose information may include configuration information, which may include a set of scalar parameters that specify the positions of all of the robot's points relative to a fixed coordinate system. The position information may indicate positions of one or more joints of the robot 108, a direction that the robot 108 is facing, or other orientation information associated with the robot 108 (e.g., roll, pitch, yaw, etc.). In response to sending the request, the sensor system 102 may receive pose information indicating a pose of the robot 108 relative to the first location of the plurality of locations. The sensor system 102 or robot 108 may adjust, based on the pose information, a position of the sensor system 102 such that the OGI camera 114 is facing the first location.

The sensor system 102 may receive an indication that the orientation of the cameras 113 or 114 matches the orientation information associated with a location. For example, the robot 108 may use an actuator to adjust the position of the sensor system 102 to allow the pipe to be within view of a camera of the sensor system 102 and after adjusting the sensor system 102, the robot 108 may send a message to the sensor system 102 indicating that the sensor system 102 is in the appropriate orientation for the location.

The sensor system 102 may record video or images with a camera (e.g., the RGB camera 113, the OGI camera 114, a thermal imaging camera, etc.), for example, in response to receiving the indication that the pose (position and orientation) of the camera matches the pose information for the location. The sensor system 102 may determine that a location should be inspected from multiple view points, for example, based on the path information. The determination to inspect from multiple view points may be made while at the location. For example, the sensor system 102 may determine that an object does not fit within a single frame of a camera and may take additional pictures to capture the entire object. The determination may be made autonomously by the sensor system 102 or via teleoperation (e.g., by receiving a command from a teleoperator to take additional pictures/video from additional view points). The determination to take additional pictures may be in response to determining that a leak exists at the location. The sensor system 102 may determine that a first portion of an object at the location has been recorded by the OGI camera 114. In response to determining that the first portion of the object at the first location has been recorded, the sensor system 102 may cause the robot 108 to move so that a second portion of the object is within a field of view of the OGI camera 114 or other camera. The sensor system 102 may record the second portion of the object with one or more cameras (e.g., the OGI camera 114 or RGB camera 113). For example, a portion of a pipe may be 20 feet long and the sensor system 102 may cause the robot 108 to move to multiple locations along the pipe so that the pipe may be inspected using the OGI camera 114.

In some embodiments, the sensor system 102 may determine that the robot 108 is too close to a location or object for purposes of recording the location or object. The sensor system 102 may send a message to the robot 108 to move to a location that is suitable for recording an object or location (e.g., a location such that an entire object fits within a field of view of the cameras 113-114). For example, the robot 108 may send a message to cause the sensor system 102 to record a video (e.g., or one or more images) with the OGI camera 114 or RGB camera 113. The robot 108 may receive, from the sensor system 102, an indication that the robot 108 is too close to the location or object to be recorded. In response to receiving the indication that the robot 108 is too close to the location or object, the robot 108 may move a threshold distance away from the first location. The robot 108 may cause the sensor system 102 to record the object or location with the RGB camera 113 or OGI camera 114. In some embodiments, the sensor system 102 may determine that lighting is inadequate and the sensor system 102 may illuminate an object with a light (e.g., an onboard light) of the sensor system 102 while recording an image or video.

The sensor system or robot may store the recorded video (which includes images) or images in memory, e.g., caching video for a plurality of waypoints along a route before upload. The sensor system 102 may send the first video and the second video to the server 106. Sending a video or an image may include streaming, caching, and on-board transformation of the video before sending (e.g., detecting possible gas leaks via the robot 108 and only uploading segments of the video/downressing/compression/cropping to exclude regions not including leaks, etc.). The resolution of an image may be reduced before sending to the server 106 or storing the image, for example, if no gas leak is detected in the image. The sensor system 102 or the robot 108 may transform the captured video and upload or send the transformed version of the captured video to the server 106. In some embodiments, the robot 108, sensor system 102, or server 106 may use image processing, computer vision, machine learning, or a variety of other techniques to determine whether a gas leak exists at one or more locations indicated by the path information. The sensor system 102 may determine that a gas leak exists based on one or more images or video recorded by the cameras 113-114. The sensor system 102 may record, via the RGB camera 113, an image of the first location, for example, in response to determining that a gas leak exists at the first location. In some embodiments, the reference image may be an image (e.g., a historical image) of the location that was taken during a previous inspection of the location. The sensor system 102 may obtain, from a database, a historical image of the location. The historical image may depict an absence of a gas leak at the first location on a date that the historical image was taken. Additionally or alternatively, the sensor system 102 may use Gaussian Mixture Model-based foreground and background segmentation methods, for example, such as those described in "Background Modeling Using Mixture of Gaussians for Foreground Detection: A Survey," by Thierry Bouwmans, published on Jan. 1, 2008, which is hereby incorporated by reference.

In some embodiments, the sensor system 102, the robot 108, or the server 106 may use a machine learning model to determine whether a leak exists at a location. For example, the ML subsystem 116 may use one or more machine learning models described in connection with FIG. 7 to detect whether a gas leak exists. The sensor system 102 may determine a reference image that depicts an absence of a gas leak at the location on a date that the reference image was taken. The sensor system 102 may generate, based on inputting a first image (e.g., taken by the OGI camera 114) and the reference image into a machine learning model, a similarity score. The similarity score may be determined by generating vector representations of the reference image and the first image and comparing the vector representations using a distance metric (e.g., Euclidean distance, cosine distance, etc.). The sensor system 102 may compare the similarity score with a threshold similarity score. The sensor system 102 may determine that a gas leak exists at the first location, for example, based on comparing the similarity score with a threshold similarity score. One or more images may be preprocessed before being input into a machine learning model. For example, an image may be resized, one or more pixels may be modified (e.g., the image may be converted from color to grayscale), thresholding may be performed, or a variety of other preprocessing techniques may be used prior to inputting the image into the machine learning model. As described herein, inputting an image into a machine learning model may comprise preprocessing the image.

In some embodiments the ML subsystem may use a machine learning model to generate a vector representation (e.g., a vector in a latent embedding space, such as a vector generated by a trained autoencoder responsive to an image or series thereof like in video, etc.) of one or more images taken by the OGI camera 114. The sensor system 102 may determine that a gas leak exists or does not exist, for example, based on a comparison of the vector representations. The sensor system 102 may obtain a plurality of historical images associated with the location (e.g., images taken on previous inspections of the location). The sensor system 102 or server 106 may generate, based on inputting the historical images into a machine learning model, a first vector representation of the images. The sensor system 102 may generate, based on inputting a second plurality of images (e.g., images taken during the current inspection) into a machine learning model, a vector representation of the second plurality of images; and determining, based on a comparison of the first vector with the second vector, that a gas leak exists at the first location.

In some embodiments, the sensor system 102 may send images (e.g., in videos, in video format, or as standalone images) to the server 106 so that the server 106 may train one or more machine learning models to detect gas leaks. The images may be labeled by a user that monitors the robot 108. For example, the label may indicate whether a gas leak exists or not. The sensor system 102 may record (e.g., via the OGI camera) a set of images including an image for each location of the plurality of locations indicated by the path information. The sensor system 102 may generate a label for each image in the set of images. Each label may indicate a location associated with a corresponding image. The sensor system 102 may send the set of images to the server 106 for use in training a machine learning model to detect gas leaks. The server 106 may provide a user interface for users to annotate one or more images received from the sensor system 102 or robot 108. The server 106 may receive a first set of images, associated with one or more locations indicated by the path information. The server 106 may generate a webpage including a user interface that is configured to receive input corresponding to one or more portions of an image. The input may be received from a user and may indicate whether or not a gas leak is shown in the image. The server 106 may receive, via the webpage, input indicate that a gas leak exists in the one or more images. The server 106 may generate, based on the input, a training data set for a machine learning model. For example, the input received from a user may indicate a label to use for each image in the dataset (e.g., whether a gas leak exists or not).

In some embodiments, the machine learning model may be an object detection model with one or more convolutional layers and may be trained to detect whether a plume of gas exists in an image taken by an OGI camera 114. The sensor system 102 may determine, based on output from the machine learning model, a target location within the plume of gas. For example, the machine learning model may an object detection and localization model configured to output the coordinates (in pixel space) of a bounding box surrounding the plume of gas and the sensor system 102 may use the coordinates to determine a target location (e.g., the center of the bounding box) within the plume of gas. In some embodiments, the sensor system 102 may include a laser sensor and may use the laser sensor to detect a concentration level of gas at the determined target location. The sensor system 102 may send a message (e.g., an alert) to the server 106, for example, based on determining that the concentration level of gas at the target location exceeds a threshold concentration level.

In some embodiments, the machine learning model used to detect whether a gas leak exists may be a Siamese network model. A Siamese network model may be used, for example, if training data is sparse. The Siamese network may be able to determine that an image of a location where a gas leak exists is different from one or more previous images taken of the location when no gas leak existed at the location. The Siamese network may be trained using a dataset comprising image pairs of locations. The image pairs may include positive image pairs (e.g., with two images that show no gas leak at a location). The image pairs may include negative image pairs (e.g., with one image that shows no gas leak at the location and a second image that shows a gas leak at the location). The Siamese network may be trained using a training dataset that includes sets comprising an anchor image, a positive image, and a negative image. The anchor image may be an first image associated with a location when no gas leak is present. The positive image may be a second image (e.g., different from the first image) of the location when no gas leak is present. The negative image may be an image of the location when a gas leak exists at the location. The Siamese network may use a triplet loss function when using sets of images with anchor, positive, and negative images. The Siamese network may be trained to generate vector representations such that a similarity metric (e.g., Euclidean distance, Cosine similarity, etc.) between vector representations of an anchor image and a positive image is smaller than a similarity metric between vector representations of an anchor image and a negative image.

The Siamese network may comprise two or more identical subnetworks. The subnetworks may have the same architecture (e.g., types and numbers of layers) and may share the same parameters and weights. In some embodiments, the Siamese network may be implemented as a single network that takes as input two images (e.g., one after the other) and generates vector representations for each of the input images. Weights updated in one subnetwork may be updated in each other subnetwork in the same manner (e.g., corresponding weights in each subnetwork may be the same). Each subnetwork may include a convolutional neural network (e.g., with one or more convolutional or depthwise convolutional layers), an image encoding layer (e.g., a fully connected layer), a distance function layer, or an output layer (e.g., using a sigmoid activation function). In some embodiments, the distance function layer may be used as the output layer, for example, if a contrastive loss function is used. The distance function layer may output a distance value (e.g., Euclidean distance, or a variety of other distance metrics) indicating how similar two images are. For example, a first image of the two images may be an image taken when no gas leak existed at the location, and a second image of the two images may be an image taken during the current inspection. During training, the Siamese network may take as input a first image of a first location (e.g., when no gas leak is present), generate encodings of the first image, then without performing any updates on weights or biases of the network, may take as input a second image. The second image may be an image of a second location or may be an image of the first location when a gas leak is present at the first location.

The sensor system 102 may determine that a leak exists, for example, if the distance corresponding to two images is below a threshold. The Siamese network may use a loss function (e.g., binary cross-entropy, triplet loss, contrastive loss, or a variety of other loss functions). The Siamese network may be trained via gradient descent (e.g., stochastic gradient descent) and backpropagation. The Siamese network may be trained to determine a threshold value (e.g., that is compared with output from the distance function layer) that maximizes (e.g., as determined according to a loss function used by the Siamese network) correct classifications and minimizes incorrect ones. For example, the Siamese network may be trained to determine that an image with a leak (e.g., an image taken by the OGI camera 114 showing a plume of gas) does not match an image of the same location where no gas leak exists. The Siamese network may output an indication of whether two input images are the same or different. If one image is a historical image with no gas leak present and one image is a new image with a gas leak (e.g., the new image shows a plume of gas), the Siamese network may generate output indicating that the images do not match and the sensor system 102 may determine that a gas leak is present at the corresponding location.

The sensor system 102 may send an alert or message to the server 106 or a user device 104 if the sensor system 102 determines that a gas leak exists at a location. The sensor system 102 may make an initial determination of whether there is a gas leak at a location and then send the images to the server 106 for confirmation. The sensor system 102 may use a first machine learning model to make the determination and the server 106 may use a second machine learning model to confirm the determination made by the sensor system 102. The machine learning model used by the server 106 may include more parameters (e.g., weights, layers, etc.) than the machine learning model used by the sensor system 102 or may obtain higher accuracy, or precision on a test set of images. The server 106 may request additional images be recorded, for example, if there is a conflict between the determination made by the sensor system 102 and the server 106. For example, additional images may be requested if the sensor system 102 determines that there is a gas leak at the location and the server 106 (e.g., using the same images used by the sensor system) determines that no gas leak exists at the location. The server 106 may receive images (e.g., taken by the OGI camera 114) and may determine, based on inputting the images into a machine learning model, that there is no gas leak at the first location. In response to determining that there is no gas leak at the first location, the server 106 may send an indication that no gas leak was detected in the first plurality of images or the server 106 may send a request (e.g., to the sensor system 102) to record a second plurality of images of the first location. The second plurality of images may be used by the server 106 to confirm whether or not a gas leak exists at the location. In response to receiving the request to record additional images, the sensor system 102 may cause the robot 108 to move a threshold distance, for example, to obtain a different viewpoint of the location. The sensor system 102 may record additional images or video of the location from the different viewpoint. Using a different view to take additional pictures may enable the sensor system 102 or server 106 to confirm whether or not a gas leak is present at the location. The server 106 may cause the robot to move to the next location of the plurality of locations indicated by the path information, for example, in response to determining that there is no gas leak at the first location.

The sensor system 102 may determine that a gas leak exists at a location by applying motion detection techniques (e.g., background subtraction) to one or more images taken by the OGI camera 114. For example, the sensor system 102 may generate a subtraction image by using a first image as a reference image and subtracting one or more subsequent images (e.g., images recorded after the first image) from the reference image. The sensor system 102 may generate a binary image by thresholding the subtraction image. The binary image may indicate gas leaks as white pixels. For example, if more than a threshold number of white pixels are detected in the binary image, the sensor system 102 may determine that a gas leak exists at the location.

The server 106 may process images or video recorded by the sensor system 102 to determine whether a gas leak is present at a location. The server 106 may use one or more machine learning models to analyze the first video or the second video to determine whether a gas leak is present at a location. In response to sending images or video to the server 106, the sensor system 102 may receive, from the server 106, a message indicating that the images or video do not indicate a gas leak. The message may indicate that no gas leak was detected in the images or video. For example, the server 106 may input the images or video into a machine learning model described in connection with FIG. 4. The sensor system 102 may cause the robot 108 to continue along the path, for example, in response to receiving the message from the server 106. For example, after receiving a message from the server 106 indicating that no gas leak was detected at a first location, the sensor system 102 may cause the robot 108 to move to a second location indicated by the path information. In some embodiments, the message from the server 106 may indicate that additional video should be recorded with the optical gas imaging camera 114 or the RGB camera 113. In some embodiments the server 106 may obtain the images or video, determine that the images or video indicate a gas leak exists, and in response to determining that the first video indicates a gas leak, the server 106 may cause the sensor system 102 to record an additional video with the OGI camera 114 at the corresponding location. In some embodiments, the sensor system 102 or the robot 108 may flag an image for review by a user. For example, the sensor system 102 or the robot 108 may send an image to a user to confirm whether or not a gas leak exists at a location (e.g., even without the user making the final determination of whether a gas leaks exists).

In some embodiments, the server 106 may oversee or control a plurality of robots. The robots may be located in various places throughout an environment or facility. The server 106 may determine a robot 108 that is closest to a location to be inspected and may cause the robot 108 to inspect the location. The server 106 may obtain the inspection path information. The server 106 may obtain location information corresponding to the plurality of robots (e.g., including one or more instances of the robot 108). The server 106 may determine, based on the location information, that the robot 108 is closer to the first location than other robots of the plurality of robots and in response to determining that the robot 108 is closer to the first location than other robots of the plurality of robots, may cause the robot 108 to inspect the first location or may send the inspection path information to the robot 108.

The sensor system 102, the robot 108, or the server 106 may communicate with each other and may share information indicating resource levels or other information. For example, the sensor system 102 may share information indicating a battery level of the sensor system 102, whether one or more components (e.g., the location sensor 112, the RGB camera 113, the OGI camera 114, the cooling system 115, or the ML subsystem 116) is working properly. The sensor system 102 may receive information indicating a resource level of the robot 108 or whether one or more components of the robot 108 is working properly. The sensor system 102 may receive battery power from the robot 108. For example, if a battery level of the sensor system 102 is below a threshold and a battery level of the robot 108 is above a threshold (e.g., the same threshold or a different threshold), the sensor system 102 may draw power from the battery of the robot 108. In some embodiments, the server may determine to use one robot over other robots based on status information associated with the robots or sensor systems associated with corresponding robots of the plurality of robots. The status information may indicate a battery level, temperature or other information about the robot. For example, the server 106 may receive information indicating that a temperature of the sensor system 102 of a robot is between a threshold range of temperatures and that the robot is within a threshold distance of the location. In response, the server 106 may determine to cause the robot to inspect the location.

The sensor system 102 may receive information indicating a battery level of the robot. The sensor system 102 may determine (e.g., based on the information indicating a battery level of the robot), that the battery level of the robot satisfies a threshold. For example, the battery level may be below a threshold amount required to complete an inspection of a facility. The sensor system 102 may determine that the robot 108 may need to conserve battery for moving between locations on the inspection path. The sensor system 102 may (e.g., one or more locations of the plurality of locations along the path have yet to be recorded. in response to determining that the battery level of the robot satisfies the threshold and that one or more locations of the plurality of locations along the path have yet to be recorded, causing the sensor system to stop receiving energy from a battery of the robot and begin receiving energy from a battery of the sensor system. In response to determining that the battery level of the robot satisfies the threshold and that one or more locations of the plurality of locations along the path have yet to be recorded, causing the sensor system to stop receiving energy from a battery of the robot and begin receiving energy from a battery of the sensor system.

The robot 108 may be an bipedal robot, a wheeled robot (such as one with mecanum or omni wheels), a quadruped robot (like Spot™ from Boston Dynamics™ of Boston Massachusetts), a track-drive robot, a articulated robot (e.g., an arm having two, six, or ten degrees of freedom, etc.), a cartesian robot (e.g., rectilinear or gantry robots, robots having three prismatic joints, etc.), Selective Compliance Assembly Robot Arm (SCARA) robots (e.g., with a donut shaped work envelope, with two parallel joints that provide compliance in one selected plane, with rotary shafts positioned vertically, with an end effector attached to an arm, etc.), delta robots (e.g., parallel link robots with parallel joint linkages connected with a common base, having direct control of each joint over the end effector, which may be used for pick-and-place or product transfer applications, etc.), polar robots (e.g., with a twisting joint connecting the arm with the base and a combination of two rotary joints and one linear joint connecting the links, having a centrally pivoting shaft and an extendable rotating arm, spherical robots, etc.), cylindrical robots (e.g., with at least one rotary joint at the base and at least one prismatic joint connecting the links, with a pivoting shaft and extendable arm that moves vertically and by sliding, with a cylindrical configuration that offers vertical and horizontal linear movement along with rotary movement about the vertical axis, etc.), self-driving car, a kitchen appliance, construction equipment, or a variety of other types of robots. The robot may include one or more cameras, joints, servomotors, stepper motor actuators, servo motor actuators, pneumatic actuators, or a variety of other components. In some embodiments, the robot 108 may include wheels, continuous tracks, or a variety of other means for moving, e.g., with or without a tether. In some embodiments, the robot 108 may be a drone or other flying robot that is capable of flying to each location indicated in the path information. In some embodiments, the robot 108 may be a boat or submarine that is capable of inspecting locations underwater. In some embodiments, the robot 108 may be a drone capable of traveling in outer space and to inspect one or more locations on a space station or other spacecraft. The system 100 may include one or more processors. Some processors might be in the robot 108, in the server 106, or in the sensor system 102. Instructions for implementing one or more aspects described herein may be executed by the one or more processors. The instructions may be distributed among the robot 108, the server 106, or the sensor system 102. The system 100 may be compliant with one or more regulations set forth by the Environmental Protection Agency. For example, the system 100 may be configured to perform inspections that show whether a facility is compliant with requirements in "Oil and Natural Gas Sector: Emission Standards for New, Reconstructed, and Modified Sources" in the Federal Register ("2016 NSPS OOOOa") or its corresponding 2018 Proposal.

Figure 2A:
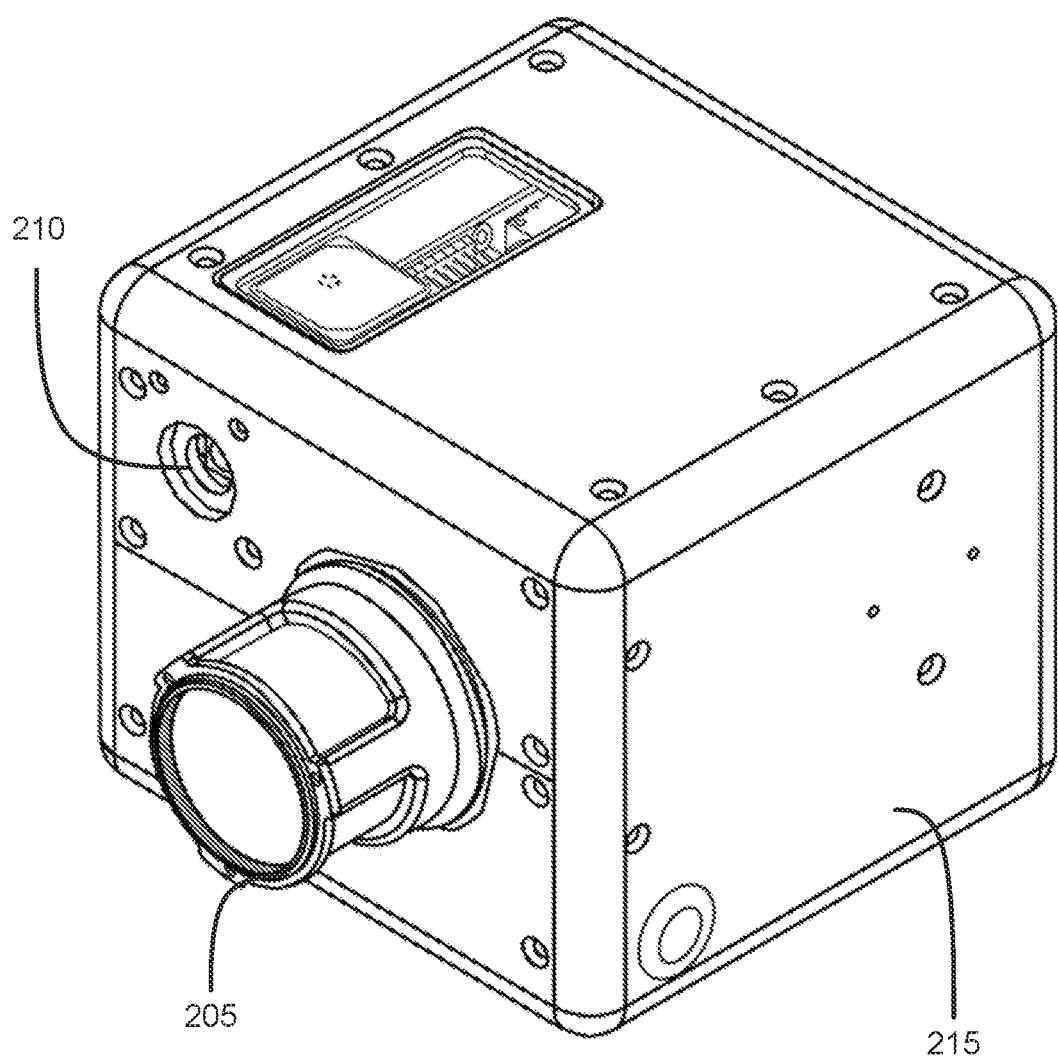
FIG. 2A shows an example sensor system, in accordance with some embodiments.

FIG. 2A shows an example sensor system 201, that may include any component or perform any function described above in connection with the sensor system 102 of FIG. 1. The sensor system 201 may include an OGI camera 205 (e.g., which may be the same as the OGI camera 114 of FIG. 1), an RGB camera 210 (e.g., which may be the same as the RGB camera 113 of FIG. 1), and a case 215 to house the components of the sensor system 201. The sensor system 201 may include any component discussed in connection with FIG. 8 below.

Figure 2B:
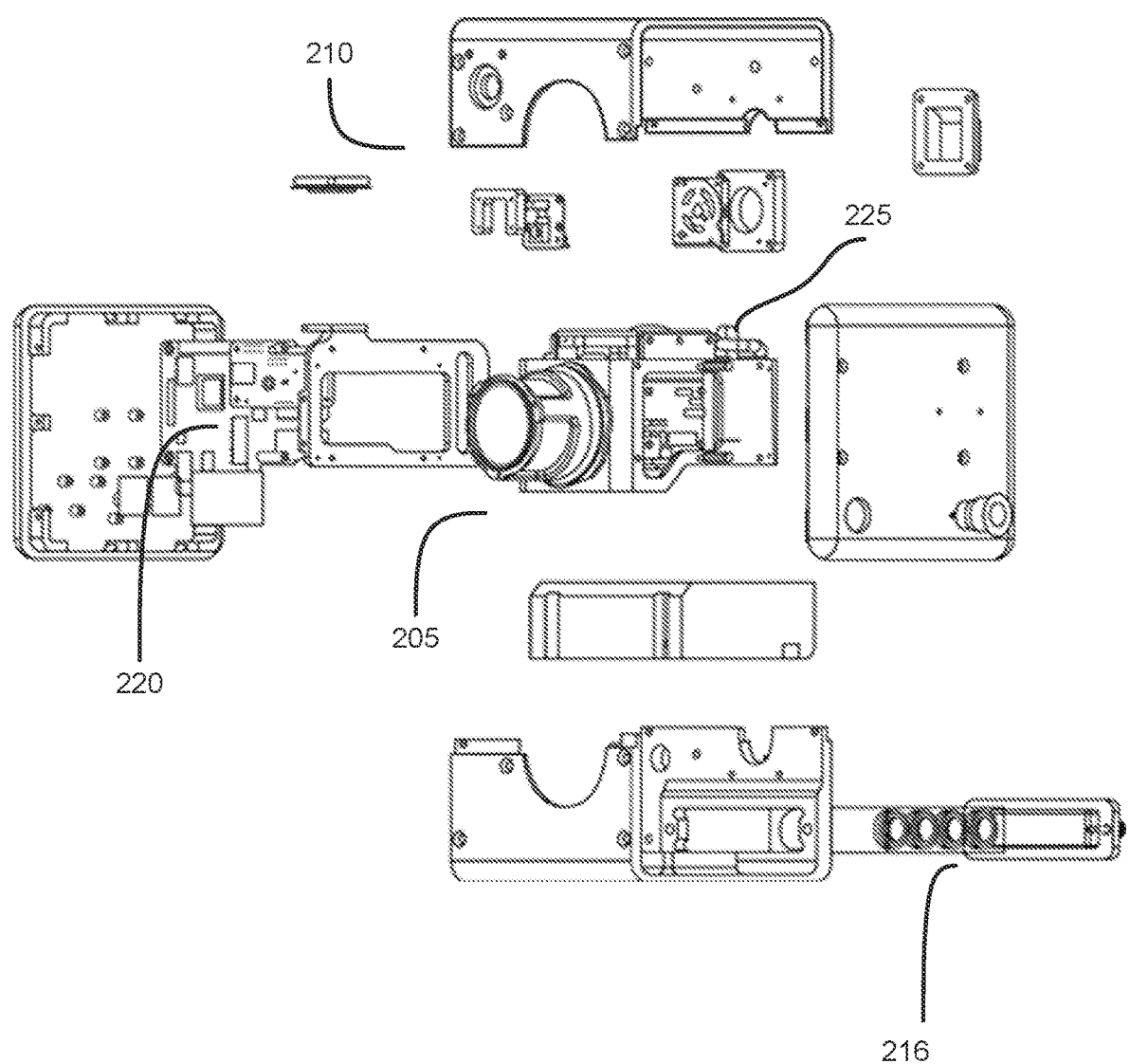
FIG. 2B shows an example sensor system in exploded view, in accordance with some embodiments.

FIG. 2B shows an exploded view of the sensor system 201 with an exploded view of the RGB camera 210 and the OGI camera 205. The sensor system 201 may include a printed circuit board 220. The printed circuit board 220 may include a central processing unit, a graphics processing unit, a vision processing unit (e.g., a microprocessor designed to accelerate machine vision tasks), or a variety of components such as those described in connection with FIG. 8 below. The vision processing unit may be suitable for executing machine learning models or other computer vision techniques such as those described in connection with FIG. 1 or FIG. 7. The sensor system 102 described in connection with FIG. 1 may include a vision processing unit to assist in performing one or more machine learning operations described. The sensor system 201 may include a cooling system 225 (e.g., which may be the same as the cooling system 115 of FIG. 1). The sensor system 201 may include one or more batteries 216.

Figure 3:
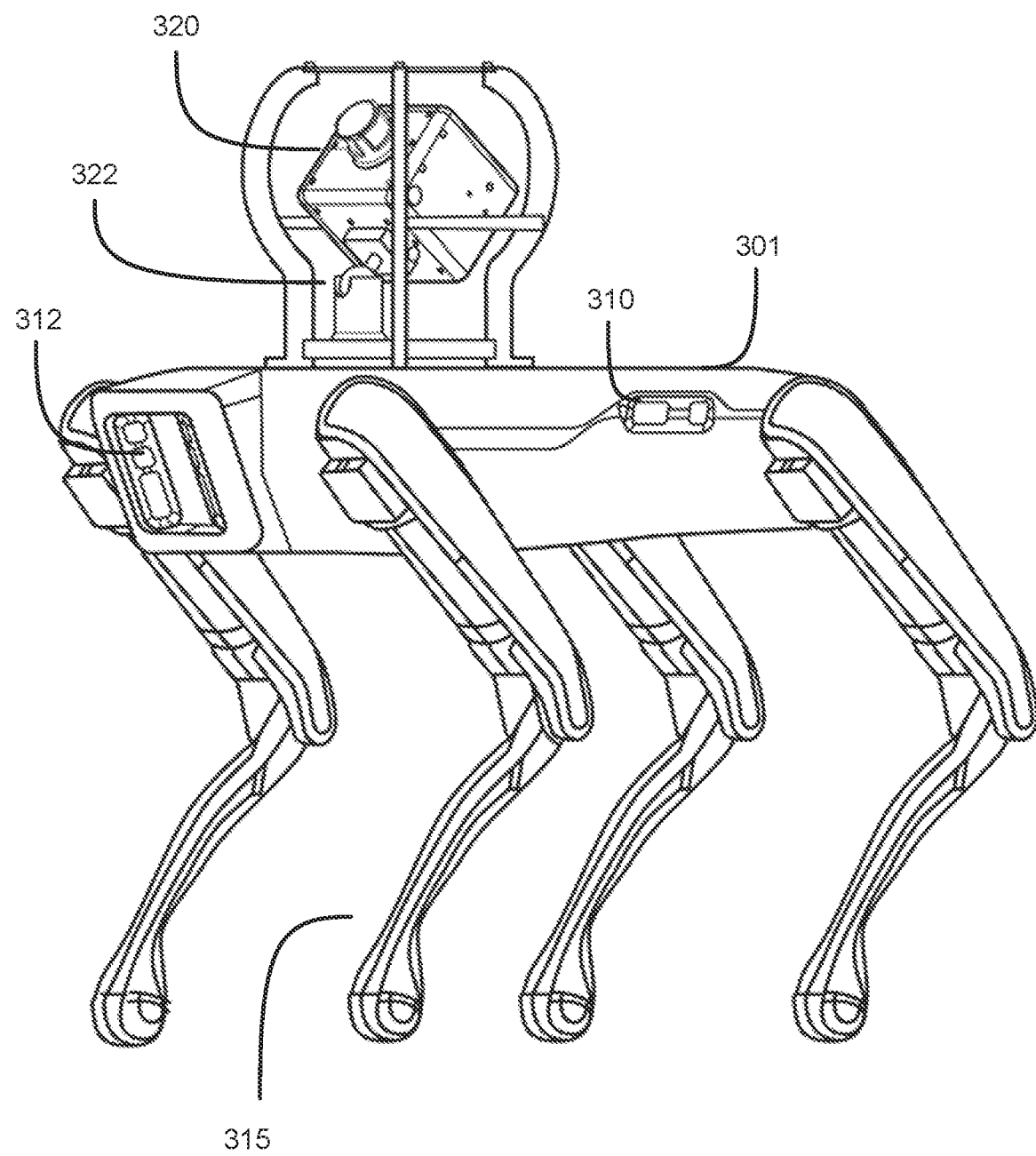
FIG. 3 shows an example robot and sensor system, in accordance with some embodiments.

FIG. 3 shows an example robot 301 (e.g., the robot 108) with the sensor system 320 (e.g., the sensor system 102) attached. The robot 301 may include sensors 310 and sensors 312. The sensors 310-312 may include RGB cameras, infrared cameras, depth sensing cameras, or a variety of other sensors. The cameras may be stereo cameras that provide black and white images and video. The robot 301 may be communicatively coupled with the sensor system 320. The robot 301 may be able to cause the sensor system 322 to rotate up/down or from side to side via a joint 322 or other means, e.g., joint 322 may include three degrees of freedom independently actuated by the robot with servo motors of stepper motors (e.g., pitch, roll, and yaw). The robot 301 may include one or more legs 315 for moving in an environment, each being actuated by two or more such actuators in some cases.

Figure 4:
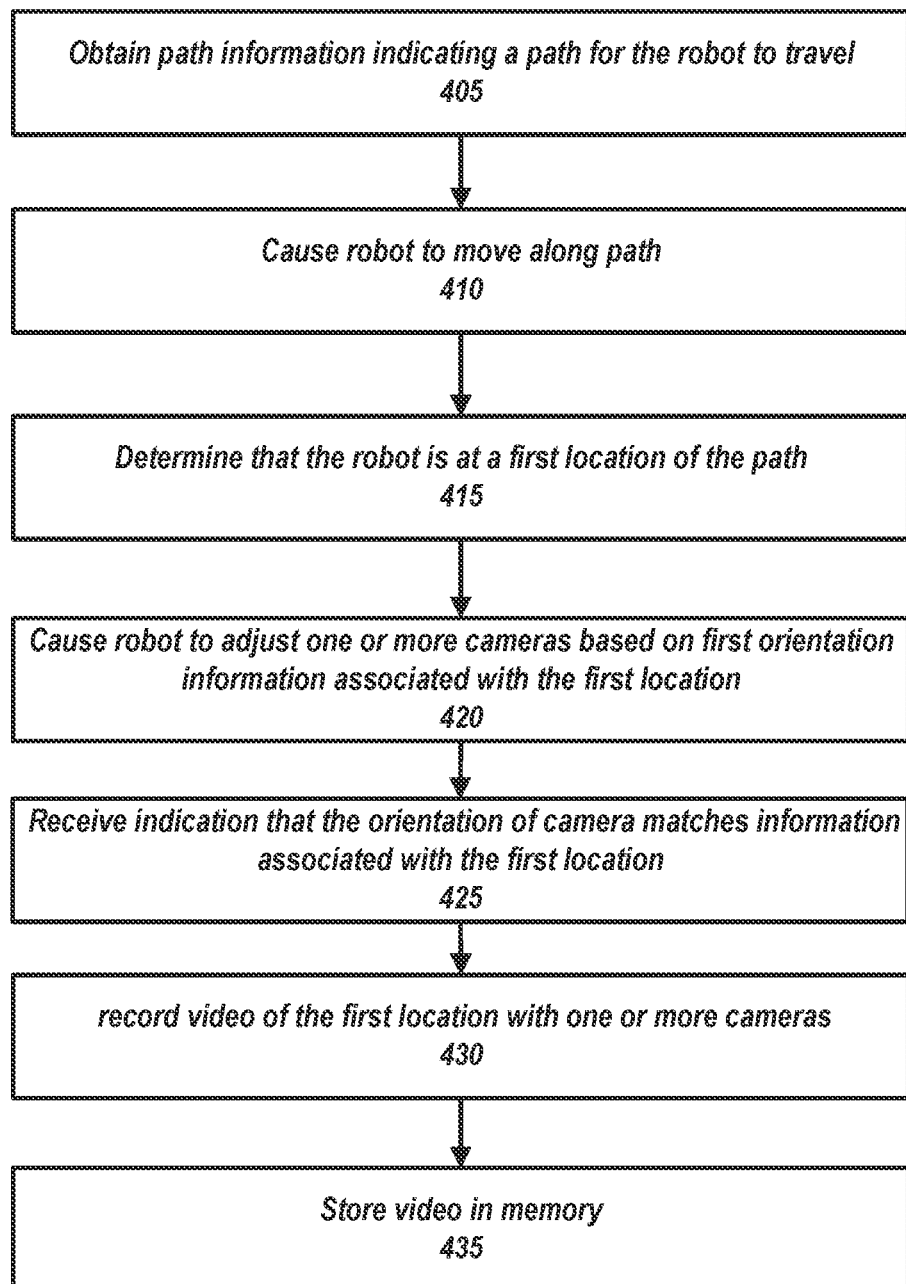
FIG. 4 shows an example flowchart of the actions involved in inspecting with a robot, in accordance with some embodiments.

FIG. 4 shows an example flowchart of the actions involved in inspecting for gas leaks with a robot. For example, process 400 may represent the actions taken by one or more devices shown in FIGS. 1-3 or FIG. 8. At 405, robot system 100 (e.g., using one or more components in system 100 (FIG. 1) or computing system 800 via I/O interface 850 and/or processors 810a-810n (FIG. 8)) may obtain path information indicating a path for a robot (e.g., the robot 108 of FIG. 1) to travel. The path information may indicate a plurality of locations along the path to inspect with a sensor system (e.g., the sensor system 102 of FIG. 1). Each location may be associated with orientation information that indicates an orientation that the sensor system should be moved to for recording a video. For example, an orientation of the sensor system at a particular location may allow the sensor system to capture video or images of a gas line or other area of interest.

At 410, robot system 100 (e.g., using one or more components in system 100 (FIG. 1) and/or computing system 800 via one or more processors 810a-810n and system memory 820 (FIG. 8)) may cause the robot to move along the path.

At 415, robot system 100 (e.g., using one or more components in system 100 (FIG. 1) and/or computing system 800 via one or more processors 810a-810n, I/O interface 850, and/or system memory 820 (FIG. 8)) may determine that the robot is at a first location of the path. The determination may be made based on information received via a location sensor of the robot or a location sensor of the sensor system.

At 420, robot system 100 (e.g., using one or more components in system 100 (FIG. 1) and/or computing system 800 via one or more processors 810a-810n (FIG. 8)) may cause the robot to adjust one or more cameras based on first orientation information associated with the first location.

At 425, robot system 100 (e.g., the sensor system 102 or the server 106 (FIG. 1) or computing system 800 (FIG. 8)) may receive an indication that the orientation of the camera matches the orientation information associated with the first location.

At 430, robot system 100 (e.g., the sensor system 102 (FIG. 1) and/or computing system 800 via one or more processors 810a-810n (FIG. 8)) may record video or one or more images of the first location with one or more cameras (e.g., via a camera of the sensor system). The sensor system may record a first video with the OGI camera and a second video with the RGB camera, for example, in response to receiving an indication OGI camera matches the orientation information.

At 435, robot system 100 (e.g., the sensor system 102 (FIG. 1) and/or computing system 800 via one or more processors 810a-810n (FIG. 8)) may store one or more recorded images or videos of the first location in memory.

It is contemplated that the actions or descriptions of FIG. 4 may be used with any other embodiment of this disclosure. In addition, the actions and descriptions described in relation to FIG. 4 may be done in alternative orders or in parallel to further the purposes of this disclosure. For example, each of these actions may be performed in any order, in parallel, or simultaneously to reduce lag or increase the speed of the system or method, none of which is to suggest that any other description is limiting. Furthermore, it should be noted that any of the devices or equipment discussed in relation to FIGS. 1-3 could be used to perform one or more of the actions in FIG. 4.

Figure 5:
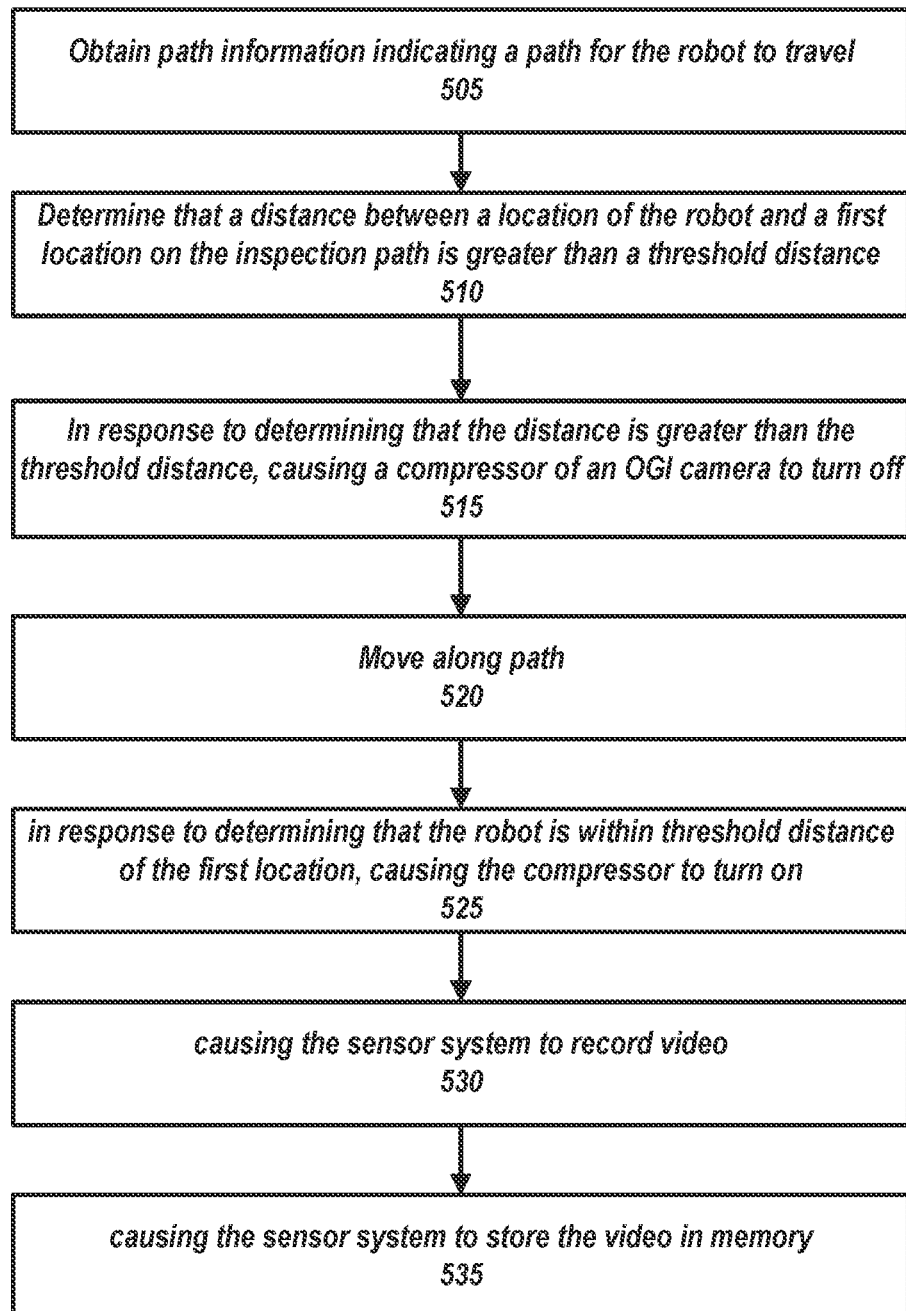
FIG. 5 shows an example flowchart of the actions involved in inspecting with a robot, in accordance with some embodiments.

FIG. 5 shows an example flowchart of the actions involved in inspecting for gas leaks with a robot. For example, process 500 may represent the actions taken by one or more devices shown in FIGS. 1-3 or FIG. 8. At 505, the robot 108 (e.g., using one or more components in system 100 (FIG. 1) or computing system 800 via I/O interface 850 and/or processors 810a-810n (FIG. 8)) may obtain path information indicating a path for a robot (e.g., the robot 108 of FIG. 1) to travel. The path information may indicate a plurality of locations along the path to inspect with a sensor system (e.g., the sensor system 102 of FIG. 1). Each location may be associated with orientation information that indicates an orientation that the sensor system should be moved to for recording a video. For example, an orientation of the sensor system at a particular location may allow the sensor system to capture video or images of a gas line or other area of interest.

At 510, the robot 108 (e.g., using one or more components in system 100 (FIG. 1) and/or computing system 800 via one or more processors 810a-810n and system memory 820 (FIG. 8)) may determine (e.g., based on information received via a location sensor) that a distance between a location of the robot and a first location on the inspection path is greater than a threshold distance.

At 515, the robot 108 (e.g., using one or more components in system 100 (FIG. 1) and/or computing system 800 via one or more processors 810a-810n, I/O interface 850, and/or system memory 820 (FIG. 8)) may cause a compressor of an OGI camera to turn off, for example, in response to determining that the distance is greater than the threshold distance.

At 520, the robot 108 (e.g., using one or more components in system 100 (FIG. 1) and/or computing system 800 via one or more processors 810a-810n (FIG. 8)) may move along the path indicated by the inspection path information.

At 525, the robot 108 (e.g., using one or more components in system 100 (FIG. 1) or computing system 800 (FIG. 8)) may cause the compressor to turn on, for example, in response to determining that the robot is within a threshold distance of the first location (e.g., within 10 feet of the first location, etc.).

At 530, the robot 108 (e.g., using one or more components in system 100 (FIG. 1) and/or computing system 800 via one or more processors 810a-810n (FIG. 8)) may cause the sensor system to record video.

At 535, the robot 108 (e.g., using one or more components in system 100 (FIG. 1) and/or computing system 800 via one or more processors 810a-810n (FIG. 8)) may cause the sensor system to store the video in memory.

It is contemplated that the actions or descriptions of FIG. 5 may be used with any other embodiment of this disclosure, as is generally the case with the various features described herein. In addition, the actions and descriptions described in relation to FIG. 5 may be done in alternative orders or in parallel to further the purposes of this disclosure. For example, each of these actions may be performed in any order, in parallel, or simultaneously to reduce lag or increase the speed of the system or method, none of which is to suggest that any other description is limiting. Furthermore, it should be noted that any of the devices or equipment discussed in relation to FIGS. 1-3 could be used to perform one or more of the actions in FIG. 5.

Figure 6:
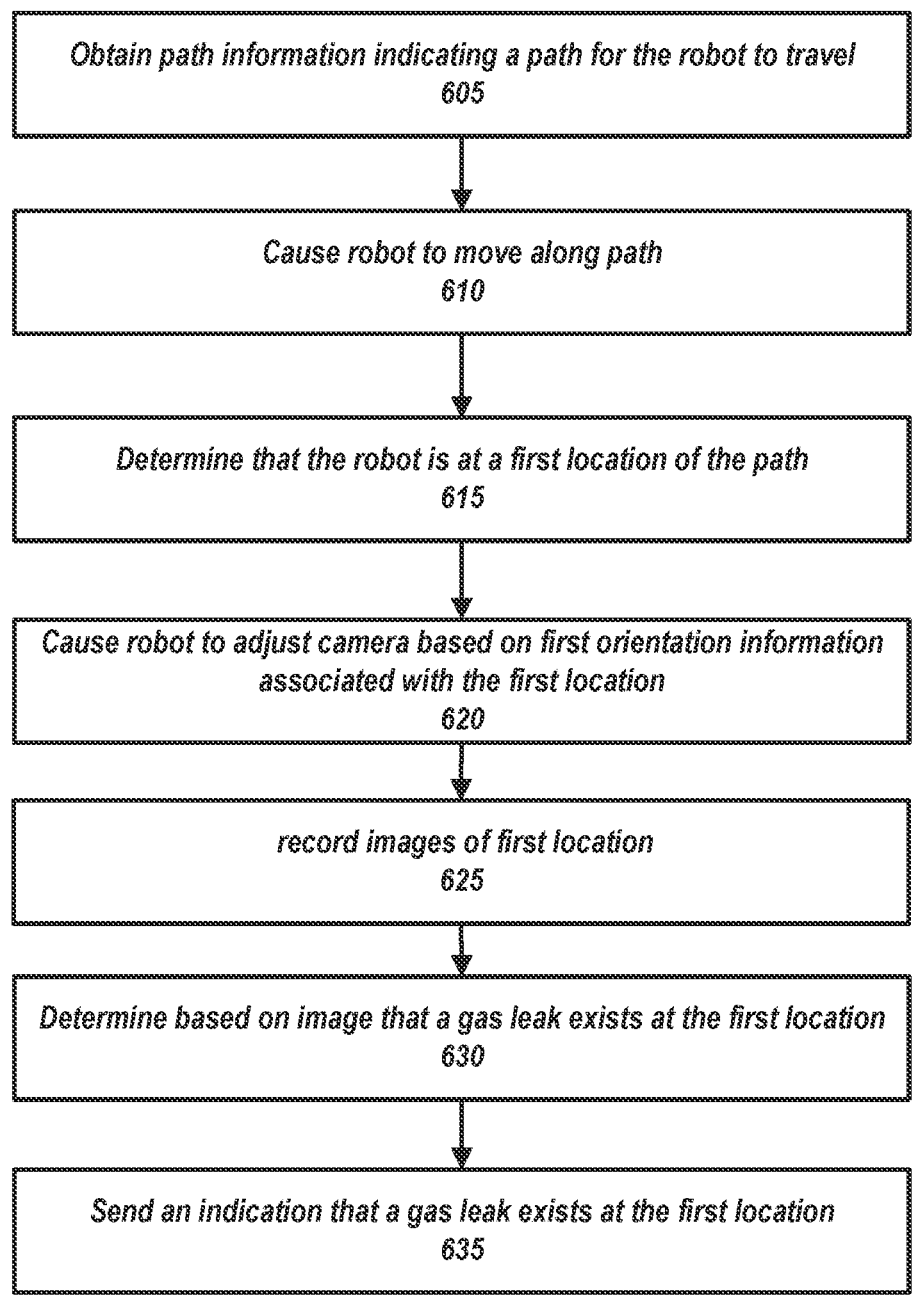
FIG. 6 shows an additional example flowchart of the actions involved in inspecting with a robot, in accordance with some embodiments.

FIG. 6 shows an example flowchart of the actions involved in inspecting for gas leaks with a robot. For example, process 600 may represent the actions taken by one or more devices shown in FIGS. 1-3 or FIG. 8. At 605, robot system 100 (e.g., using one or more components in system 100 (FIG. 1) or computing system 800 via I/O interface 850 and/or processors 810a-810n (FIG. 8)) may obtain path information indicating a path for a robot (e.g., the robot 108 of FIG. 1) to travel. The path information may indicate a plurality of locations along the path to inspect with a sensor system (e.g., the sensor system 102 of FIG. 1). Each location may be associated with orientation information that indicates an orientation that the sensor system should be moved to for recording a video. For example, an orientation of the sensor system at a particular location may allow the sensor system to capture video or images of a gas line or other area of interest.

At 610, robot system 100 (e.g., using one or more components in system 100 (FIG. 1) and/or computing system 800 via one or more processors 810a-810n and system memory 820 (FIG. 8)) may cause the robot to move along the path.

At 615, robot system 100 (e.g., using one or more components in system 100 (FIG. 1) and/or computing system 800 via one or more processors 810a-810n, I/O interface 850, and/or system memory 820 (FIG. 8)) may determine that the robot is at a first location of the path. The determination may be made based on information received via a location sensor of the robot or a location sensor of the sensor system.

At 620, robot system 100 (e.g., using one or more components in system 100 (FIG. 1) and/or computing system 800 via one or more processors 810a-810n (FIG. 8)) may cause the robot to adjust one or more cameras based on first orientation information associated with the first location.

At 625, robot system 100 (e.g., the sensor system 102 or the server 106 (FIG. 1) or computing system 800 (FIG. 8)) may record images of a first location indicated by the path information. The sensor system may record video or one or more images of the first location with one or more cameras (e.g., via a camera of the sensor system). The sensor system may record a first video with the OGI camera and a second video with the RGB camera, for example, in response to receiving an indication OGI camera matches the orientation information.

At 630, robot system 100 (e.g., the sensor system 102 (FIG. 1) and/or computing system 800 via one or more processors 810a-810n (FIG. 8)) may determine (e.g., based on one or more images or videos recorded by the sensor system) that a gas leak exists at the first location. For example, the sensor system 102 may use background subtraction between two images recorded by the OGI camera to detect movement (e.g., of gas) in the images. Additionally or alternatively, the sensor system may input one or more images into a machine learning model (e.g., as described in FIG. 4) to detect whether gas is present at a location.

At 635, robot system 100 (e.g., the sensor system 102 (FIG. 1) and/or computing system 800 via one or more processors 810a-810n (FIG. 8)) may send an indication that a gas leak exists at the first location.

It is contemplated that the actions or descriptions of FIG. 6 may be used with any other embodiment of this disclosure. In addition, the actions and descriptions described in relation to FIG. 6 may be done in alternative orders or in parallel to further the purposes of this disclosure. For example, each of these actions may be performed in any order, in parallel, or simultaneously to reduce lag or increase the speed of the system or method, none of which is to suggest that any other description is limiting. Furthermore, it should be noted that any of the devices or equipment discussed in relation to FIGS. 1-3 could be used to perform one or more of the actions in FIG. 6.

Figure 7:
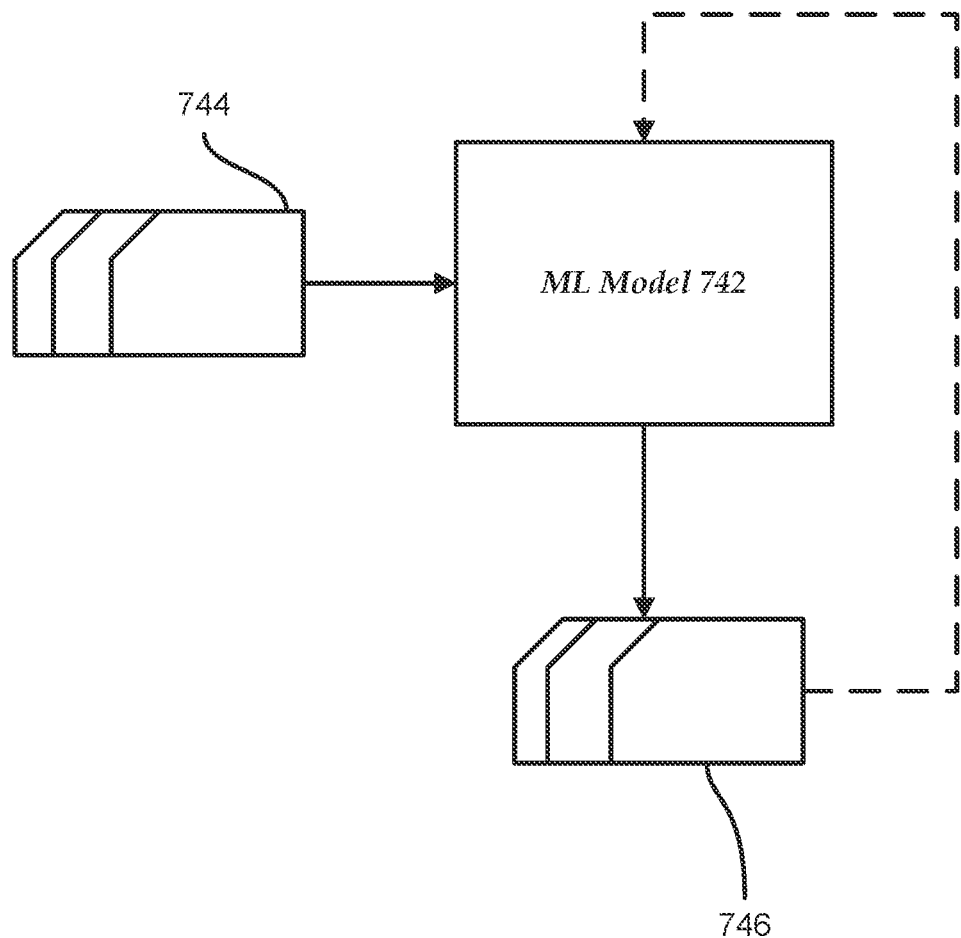
FIG. 7 shows an example machine learning model, in accordance with some embodiments.

One or more models discussed above may be implemented (e.g., in part), for example, as described in connection with the machine learning model 742 of FIG. 7. With respect to FIG. 7, machine learning model 742 may take inputs 744 and provide outputs 746. In one use case, outputs 746 may be fed back to machine learning model 742 as input to train machine learning model 742 (e.g., alone or in conjunction with user indications of the accuracy of outputs 746, labels associated with the inputs, or with other reference feedback and/or performance metric information). In another use case, machine learning model 742 may update its configurations (e.g., weights, biases, or other parameters) based on its assessment of its prediction (e.g., outputs 746) and reference feedback information (e.g., user indication of accuracy, reference labels, or other information). In another example use case, where machine learning model 742 is a neural network and connection weights may be adjusted to reconcile differences between the neural network's prediction and the reference feedback. In a further use case, one or more neurons (or nodes) of the neural network may require that their respective errors are sent backward through the neural network to them to facilitate the update process (e.g., backpropagation of error). Updates to the connection weights may, for example, be reflective of the magnitude of error propagated backward after a forward pass has been completed. In this way, for example, the machine learning model 742 may be trained to generate results (e.g., response time predictions, sentiment identifiers, urgency levels, etc.) with better recall, accuracy, and/or precision.

In some embodiments, the machine learning model 742 may include an artificial neural network. In such embodiments, machine learning model 742 may include an input layer and one or more hidden layers. Each neural unit of the machine learning model may be connected with one or more other neural units of the machine learning model 742. Such connections can be enforcing or inhibitory in their effect on the activation state of connected neural units. Each individual neural unit may have a summation function which combines the values of one or more of its inputs together. Each connection (or the neural unit itself) may have a threshold function that a signal must surpass before it propagates to other neural units. The machine learning model 742 may be self-learning or trained, rather than explicitly programmed, and may perform significantly better in certain areas of problem solving, as compared to computer programs that do not use machine learning. During training, an output layer of the machine learning model 742 may correspond to a classification, and an input known to correspond to that classification may be input into an input layer of machine learning model during training. During testing, an input without a known classification may be input into the input layer, and a determined classification may be output. For example, the classification may be an indication of whether an action is predicted to be completed by a corresponding deadline or not. The machine learning model 742 trained by the ML subsystem 116 may include one or more embedding layers at which information or data (e.g., any data or information discussed above in connection with FIGS. 1-3) is converted into one or more vector representations. The one or more vector representations of the message may be pooled at one or more subsequent layers to convert the one or more vector representations into a single vector representation.

The machine learning model 742 may be structured as a factorization machine model. The machine learning model 742 may be a non-linear model and/or supervised learning model that can perform classification and/or regression. For example, the machine learning model 742 may be a general-purpose supervised learning algorithm that the system uses for both classification and regression tasks. Alternatively, the machine learning model 742 may include a Bayesian model configured to perform variational inference, for example, to predict whether an action will be completed by the deadline. The machine learning model 742 may be implemented as a decision tree and/or as an ensemble model (e.g., using random forest, bagging, adaptive booster, gradient boost, XGBoost, etc.).

Figure 8:
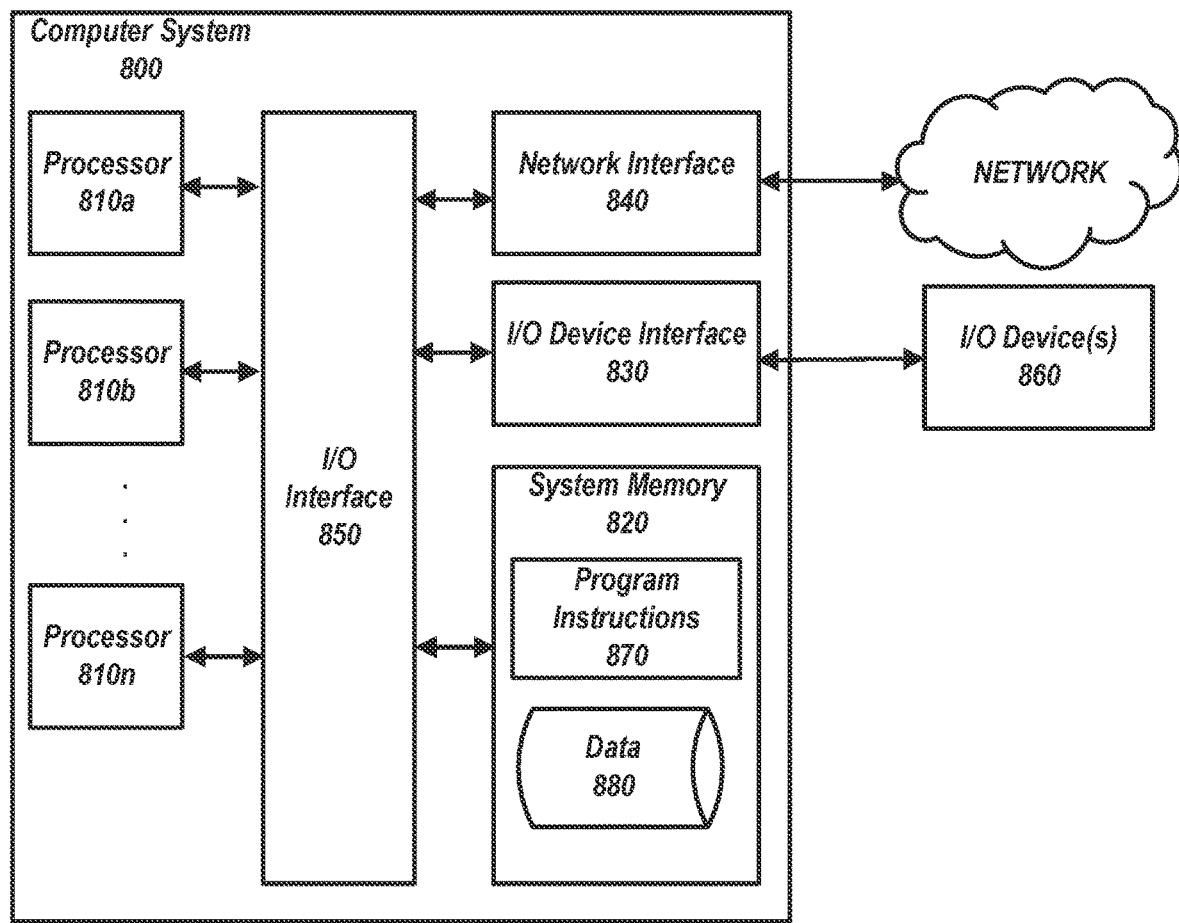
FIG. 8 shows an example computing system that may be used in accordance with some embodiments.

FIG. 8 is a diagram that illustrates an exemplary computing system 800 in accordance with embodiments of the present technique. Various portions of systems and methods described herein, may include or be executed on one or more computer systems similar to computing system 800. Further, processes and modules described herein may be executed by one or more processing systems similar to that of computing system 800.

Computing system 800 may include one or more processors (e.g., processors 810a-810n) coupled to system memory 820, an input/output I/O device interface 830, and a network interface 840 via an input/output (I/O) interface 850. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 800. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 820). Computing system 800 may be a units-processor system including one processor (e.g., processor 810a), or a multi-processor system including any number of suitable processors (e.g., 810a-810n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 800 may include a plurality of computing devices (e.g., distributed computer systems) to implement various processing functions.

I/O device interface 830 may provide an interface for connection of one or more I/O devices 860 to computing system 800. I/O devices may include devices that receive input (e.g., from a user) or output information (e.g., to a user). I/O devices 860 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 860 may be connected to computing system 800 through a wired or wireless connection. I/O devices 860 may be connected to computing system 800 from a remote location. I/O devices 860 located on remote computer system, for example, may be connected to computing system 800 via a network and network interface 840.

Network interface 840 may include a network adapter that provides for connection of computing system 800 to a network. Network interface 840 may facilitate data exchange between computing system 800 and other devices connected to the network. Network interface 840 may support wired or wireless communication. The network may include an electronic communication network, such as the Internet, a local area network (LAN), a wide area network (WAN), a cellular communications network, or the like.

System memory 820 may be configured to store program instructions 870 or data 880. Program instructions 870 may be executable by a processor (e.g., one or more of processors 810a-810n) to implement one or more embodiments of the present techniques. Instructions 870 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 820 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 820 may include a non-transitory computer readable storage medium that may have program instructions stored thereon that are executable by a computer processor (e.g., one or more of processors 810a-810n) to cause the subject matter and the functional operations described herein. A memory (e.g., system memory 820) may include a single memory device and/or a plurality of memory devices (e.g., distributed memory devices).

I/O interface 850 may be configured to coordinate I/O traffic between processors 810a-810n, system memory 820, network interface 840, I/O devices 860, and/or other peripheral devices. I/O interface 850 may perform protocol, timing, or other data transformations to convert data signals from one component (e.g., system memory 820) into a format suitable for use by another component (e.g., processors 810a-810n). I/O interface 850 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 800 or multiple computer systems 800 configured to host different portions or instances of embodiments. Multiple computer systems 800 may provide for parallel or sequential processing/execution of one or more portions of the techniques described herein.

Those skilled in the art will appreciate that computing system 800 is merely illustrative and is not intended to limit the scope of the techniques described herein. Computing system 800 may include any combination of devices or software that may perform or otherwise provide for the performance of the techniques described herein. For example, computing system 800 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 800 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 800 may be transmitted to computing system 800 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present disclosure may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine readable medium. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several disclosures. Rather than separating those disclosures into multiple isolated patent applications, applicants have grouped these disclosures into a single document because their related subject matter lends itself to economies in the application process. But the distinct advantages and aspects of such disclosures should not be conflated. In some cases, embodiments address all of the deficiencies noted herein, but it should be understood that the disclosures are independently useful, and some embodiments address only a subset of such problems or offer other, unmentioned benefits that will be apparent to those of skill in the art reviewing the present disclosure. Due to costs constraints, some features disclosed herein may not be presently claimed and may be claimed in later filings, such as continuation applications or by amending the present claims. Similarly, due to space constraints, neither the Abstract nor the Summary sections of the present document should be taken as containing a comprehensive listing of all such disclosures or all aspects of such disclosures.

It should be understood that the description and the drawings are not intended to limit the disclosure to the particular form disclosed, but to the contrary, the intention is to cover all modifications, equivalents, and alternatives falling within the spirit and scope of the present disclosure as defined by the appended claims. Further modifications and alternative embodiments of various aspects of the disclosure will be apparent to those skilled in the art in view of this description. Accordingly, this description and the drawings are to be construed as illustrative only and are for the purpose of teaching those skilled in the art the general manner of carrying out the disclosure. It is to be understood that the forms of the disclosure shown and described herein are to be taken as examples of embodiments. Elements and materials may be substituted for those illustrated and described herein, parts and processes may be reversed or omitted, and certain features of the disclosure may be utilized independently, all as would be apparent to one skilled in the art after having the benefit of this description of the disclosure. Changes may be made in the elements described herein without departing from the spirit and scope of the disclosure as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X' ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent filing, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A method comprising: obtaining inspection path information indicating a path for the robot to travel, and a plurality of locations along the path to inspect with the sensor system, wherein each location of the plurality of locations is associated with orientation information indicating an orientation that the RGB camera and the OGI camera should be placed in to record a video; causing the robot to move along the path; determining, based on information received via the location sensor, that the robot is at a first location of the plurality of locations; in response to determining that the robot is at the first location, causing the robot to adjust the OGI camera based on first orientation information associated with the first location; receiving, from the robot, an indication that an orientation of the OGI camera matches the first orientation information; in response to receiving the indication that the orientation of the OGI camera matches the first orientation information, recording a first video with the OGI camera and a second video with the RGB camera; and sending the first video and the second video to the server.
2. The method of any of the preceding embodiments, further comprising: receiving, from the server, a message indicating that the first video and the second video do not indicate a gas leak; and in response to receiving the message, causing the robot to move to a second location of the plurality of locations.
3. The method of any of the preceding embodiments, further comprising: receiving information indicating a battery level of the robot; determining, based on the information indicating a battery level of the robot, that the battery level of the robot satisfies a threshold; determining that one or more locations of the plurality of locations along the path have yet to be recorded; and in response to determining that the battery level of the robot satisfies the threshold and that one or more locations of the plurality of locations along the path have yet to be recorded, causing the sensor system to stop receiving energy from a battery of the robot and begin receiving energy from a battery of the sensor system.
4. The method of any of the preceding embodiments, wherein the OGI camera comprises an indium antimonide detector.
5. The method of any of the preceding embodiments, wherein the OGI camera comprises a quantum well infrared photodetector.
6. The method of any of the preceding embodiments, wherein causing the robot to adjust the OGI camera based on first orientation information associated with the first location cause operations further comprising: sending, to the robot, a request for pose information associated with the robot; in response to sending the request, receiving pose information indicating a pose of the robot relative to the first location of the plurality of locations; and adjusting, based on the pose information, a position of the sensor system such that the OGI camera is facing the first location.
7. The method of any of the preceding embodiments, wherein the inspection path information is associated with a first map obtained by the robot, the method further comprising: receiving, from the robot, navigation information indicating that the robot is lost, wherein the navigation information is generated based on a determination that an environment surrounding the robot does not match the first map; and in response to receiving the navigation information, sending a second map with an indication of each location of the plurality of locations to the robot.
8. The method of any of the preceding embodiments, further comprising: determining, based on an image received from the robot, the second map from a plurality of maps corresponding to the facility.
9. The method of any of the preceding embodiments, wherein the inspection path information is associated with a first map obtained by the robot, wherein the first map indicates one or more objects in the facility, the method further comprising: receiving, from the robot, an image of an environment surrounding the robot and navigation information indicating that the robot is lost, wherein the navigation information is generated based on a determination that an environment surrounding the robot does not match the first map; and in response to determining that the image does not correspond to any map of a plurality of maps associated with the facility, causing the robot to generate a new map of the facility.
10. The method of any of the preceding embodiments, wherein the first orientation information comprises a vector indicating a roll of the robot, a pitch of the robot, and a yaw of the robot.
11. The method of any of the preceding embodiments, wherein causing the robot to move along the path comprises: receiving information indicating a user that is logged into the robot; determining location permissions associated with the user; and causing, based on the location permissions associated with the user, the robot to skip a second location of the plurality of locations.
12. The method of any of the preceding embodiments, wherein the robot is configured to perform operations comprising: determining that more than a threshold amount of time has transpired since receiving a heartbeat message from the sensor system; and in response to determining that more than a threshold amount of time has transpired, moving to a charging station associated with the robot.
13. The method of any of the preceding embodiments, wherein the robot is configured to perform operations comprising: determining that more than a threshold amount of time has transpired since receiving a heartbeat message from the sensor system; and in response to determining that more than a threshold amount of time has transpired, sending a request to the server, wherein the request indicates a diagnostic procedure for the server to perform on the sensor system.
14. The method of any of the preceding embodiments, wherein the instructions for causing the robot to adjust the OGI camera based on first orientation information associated with the first location, when executed, cause the one or more processors to perform operations further comprising: determining that a first portion of an object at the first location has been recorded by the OGI camera; and in response to determining that a first portion of an object at the first location has been recorded, causing the robot to move so that a second portion of the object is within a field of view of the OGI camera.
15. The method of any of the preceding embodiments, wherein the server performs operations comprising: receiving the first video and the second video; determining that the first video indicates a gas leak; and in response to determining that the first video indicates a gas leak, causing the sensor system to record an additional video with the OGI camera at the first location.
16. The method of any of the preceding embodiments, wherein the server performs operations comprising: receiving, from the sensor system, the first video; determining, based on inputting the first video into a machine learning model, that there is no gas leak at the first location; and in response to determining that there is no gas leak at the first location, sending an indication that no gas leak was detected in the first plurality of images to the sensor system and a request indicating that the robot should move to a second location of the plurality of locations.
17. The method of any of the preceding embodiments, wherein the server performs operations comprising: obtaining the inspection path information; obtaining location information corresponding to a plurality of robots, wherein the plurality of robots comprises the robot; determining, based on the location information, that the robot is closer to the first location than other robots of the plurality of robots; and in response to determining that the robot is closer to the first location than other robots of the plurality of robots, sending the inspection path information to the robot.
18. The method of any of the preceding embodiments, wherein sending the inspection path information to the robot is performed in response to: receiving information indicating that a temperature of the sensor system is between a threshold range of temperatures.
19. The method of any of the preceding embodiments, wherein sending the inspection path information to the robot is performed in response to: receiving information indicating that a battery level of the robot is above a threshold battery level.
20. A tangible, non-transitory, machine-readable medium storing instructions that, when executed by a data processing apparatus, cause the data processing apparatus to perform operations comprising those of any of embodiments 1-19.
21. A system comprising: one or more processors; and memory storing instructions that, when executed by the processors, cause the processors to effectuate operations comprising those of any of embodiments 1-19.
22. A system comprising means for performing any of embodiments 1-19.

Embodiments May Include

1. A method comprising: receiving inspection path information indicating a path for the robot to travel, and a plurality of locations along the path to inspect with the sensor system; determining, based on information received via the location sensor, that a distance between a location of the robot and a first location of the plurality of locations is greater than a threshold distance; in response to determining that the distance is greater than the threshold distance, sending a first command to the sensor system, wherein the first command causes the compressor of the OGI camera to turn off; moving along the path; in response to determining that the robot is at a first location of the plurality of locations, sending a second command to the sensor system, wherein the second command causes the compressor of the OGI camera to turn on; causing the sensor system to record a first video with the OGI camera and a second video with the RGB camera; and causing the sensor system to send the first video and the second video to the server.
2. The method of any of the preceding embodiments, further comprising: determining that the robot is charging a power source of the robot; and in response to determining that the robot is charging the power source, causing the sensor system to turn off the compressor.
3. The method of any of the preceding embodiments, further comprising: receiving, from the sensor system, an indication that a temperature within the sensor system is above a threshold temperature; and in response to receiving the indication that a temperature within the sensor system is above a threshold temperature, causing the compressor to turn on.

4. The method of any of the preceding embodiments, further comprising: in response to receiving the indication that a temperature within the sensor system is above a threshold temperature, recording a picture of an environment surrounding the robot; determining, based on inputting a portion of the picture into a machine learning model, a first location within the environment that receives less sunlight than a second location within the environment; moving to the first location; and causing the compressor to run until a temperature of the sensor system is below the threshold temperature.

5. The method of any of the preceding embodiments, wherein a first field of view of the RGB camera encompasses a second field of view of the OGI camera.

6. The method of any of the preceding embodiments, wherein the compressor is configured to cool the sensor to below 78 degrees Kelvin.

7. The method of any of the preceding embodiments, wherein the sensor comprises an infrared detector and a spectral filter, wherein the spectral filter that prevents light outside a range of 3-5 micrometers from reaching the infrared detector.

8. The method of any of the preceding embodiments, wherein the cooling system comprises a second compressor, a refrigerant, and a condenser.

9. The method of any of the preceding embodiments, wherein the cooling system comprises a thermoelectric cooler that cools the sensor system by causing direct current to flow through a semiconductor of the cooling system.

10. The method of any of the preceding embodiments, wherein recording a first video with the OGI camera and a second video with the RGB camera comprises: adjusting, based on orientation information associated with the first location, an orientation of the robot, wherein the orientation information comprises an indication of a pitch, a yaw, and a roll of the robot; and in response to adjusting the orientation, recording the first video and the second video.

11. The method of any of the preceding embodiments, further comprising: receiving information indicating a first battery level of the sensor system; determining, based on the information indicating a first battery level of the sensor system, that the first battery level of the sensor system is above a first threshold; determining that a second battery level of the robot is below a second threshold; and based on determining that the first battery level is above the first threshold and the second batter level is below the second threshold, changing a source of power of the robot from a battery of the robot to the battery of the sensor system.

12. The method of any of the preceding embodiments, further comprising: generating, via a camera of the robot, an image of an environment adjacent to the robot; determining, based on a comparison of the image with a first map, that the first map does not match the environment; and in response to determining that the first map does not match the environment, sending, to the server, the image and a request for an updated map that corresponds to the image.

13. The method of any of the preceding embodiments, further comprising: determining that more than a threshold amount of time has transpired since receiving a heartbeat message from the sensor system; and in response to determining that more than a threshold amount of time has transpired, moving to a charging station associated with the robot.

14. The method of any of the preceding embodiments, further comprising: determining that more than a threshold amount of time has transpired since receiving a heartbeat message from the sensor system; and in response to determining that more than a threshold amount of time has transpired, causing the sensor system to reboot.

15. The method of any of the preceding embodiments, further comprising: in response to determining that more than a threshold amount of time has transpired, causing a battery of the robot to charge a battery of the sensor system.

16. The method of any of the preceding embodiments, wherein causing the sensor system to record a first video with the OGI camera and a second video with the RGB camera comprises: causing the sensor system to record the first video with the OGI camera; receiving, from the sensor system, an indication that the robot is too close to the first location; in response to receiving the indication that the robot is too close to the first location, moving a threshold distance away from the first location; and causing the sensor system to record the second video with the RGB camera.

17. The method of any of the preceding embodiments, wherein the server performs operations comprising: obtaining the inspection path information; obtaining location information corresponding to a plurality of robots, wherein the plurality of robots comprises the robot; determining, based on the location information, that the robot is closer to the first location than other robots of the plurality of robots; and in response to determining that the robot is closer to the first location than other robots of the plurality of robots, sending the inspection path information to the robot.

18. The method of any of the preceding embodiments, wherein sending the inspection path information to the robot is performed in response to: receiving information indicating that a temperature of the sensor system is between a threshold range of temperatures.

19. The method of any of the preceding embodiments, wherein sending the inspection path information to the robot is performed in response to: receiving information indicating that a battery level of the robot is above a threshold battery level.

20. A tangible, non-transitory, machine-readable medium storing instructions that, when executed by a data processing apparatus, cause the data processing apparatus to perform operations comprising those of any of embodiments 1-21.

21. A system comprising: one or more processors; and memory storing instructions that, when executed by the processors, cause the processors to effectuate operations comprising those of any of embodiments 1-21.

22. A system comprising means for performing any of embodiments 1-21.

Embodiments May Include

1. A method comprising: obtaining inspection path information indicating a path for the robot to travel, and a plurality of locations along the path to inspect with the sensor system, wherein each location of the plurality of locations is associated with orientation information indicating an orientation that the RGB camera and the OGI camera should be placed in to record a video; causing the robot to move along the path; determining, based on information received via the location sensor, that the robot is at a first location of the plurality of locations; in response to determining that the robot is at the first location, causing the robot to adjust the OGI camera based on first orientation information associated with the first location; recording a first plurality of images with the OGI camera; determining, based on the first plurality of images, that a gas leak exists at the first location; and sending, to the server, an indication that a gas leak exists at the first location.

2. The method of any of the preceding embodiments, wherein the instructions, when executed, cause the one or more processors to perform operations further comprising: in response to determining that a gas leak exists at the first location, recording, via the RGB camera, an image of the first location; and sending the image to the server.

3. The method of any of the preceding embodiments, wherein determining that a gas leak exists at the first location comprises: determining a reference image associated with the first location; generating a subtracted image by subtracting a first image of the first plurality of images from the reference image; and determining, based on the subtracted image, that a gas leak exists at the first location.

4. The method of any of the preceding embodiments, wherein determining a reference image comprises: obtaining, from a database, a historical image of the first location, wherein the historical image depicts an absence of a gas leak at the first location on a date that the historical image was taken.

5. The method of any of the preceding embodiments, wherein determining a reference image comprises: selecting, from the first plurality of images, an image that was recorded before any other image of the first plurality of images.

6. The method of any of the preceding embodiments, wherein determining that a gas leak exists at the first location comprises: determining a reference image, wherein the reference image depicts an absence of a gas leak at the first location on a date that the reference image was taken; generating, based on inputting a first image of the first plurality of images and the reference image into a machine learning model, a similarity score; comparing the similarity score with a threshold similarity score; and based on comparing the similarity score with a threshold similarity score, determining that a gas leak exists at the first location.

7. The method of any of the preceding embodiments, wherein determining that a gas leak exists at the first location comprises: obtaining a second plurality of historical images associated with the first location; generating, based on inputting the first plurality of images into a machine learning model, a first vector representation of the first plurality of images; generating, based on inputting the second plurality of images into a machine learning model, a second vector representation of the second plurality of historical images; and determining, based on a comparison of the first vector with the second vector, that a gas leak exists at the first location.

8. The method of any of the preceding embodiments, wherein the instructions, when executed, cause the one or more processors to perform operations further comprising: recording, via the OGI camera, a set of images, wherein the set of images comprises an image for each location of the plurality of locations; generating a label for each image in the set of images, wherein each label indicates a location associated with a corresponding image and indicates whether a gas leak was detected in the corresponding image; and sending the set of images to the server for use in training a machine learning model.

9. The method of any of the preceding embodiments, wherein the instructions for determining that a gas leak exists at the first location, when executed, cause the one or more processors to perform operations comprising: inputting the first plurality of images into a machine learning model, that a plume of gas exists at the first location; and in response to inputting the first plurality of images into the machine learning model, classifying one or more objects in the first plurality of images as a plume of gas.

10. The method of any of the preceding embodiments, further comprising: determining, based on output from the machine learning model and based on the first plurality of images, a target location within the plume of gas; sensing, via a laser sensor of the sensor system, a concentration level of gas at the target location; and based on determining that the concentration level of gas at the target location exceeds a threshold concentration level, sending an alert to the server.

11. The method of any of the preceding embodiments, wherein the server is configured to perform operations comprising: receiving, from the sensor system, a first set of images, wherein the first set of images is associated with one or more locations of the first plurality of locations; generating a webpage comprising a user interface, wherein the user interface is configured to receive input on one or more portions of an image; receive, via the webpage, input corresponding to one or more images of the first set of images, wherein the input indicates a gas leak exists in the one or more images; and generating, based on the input and the first set of images, a training data set for a machine learning model.

12. The method of any of the preceding embodiments, wherein the first orientation information comprises a vector indicating a roll of the robot, a pitch of the robot, and a yaw of the robot.

13. The method of any of the preceding embodiments, wherein causing the robot to move along the path, when executed, cause the one or more processors to perform operations further comprising: receiving information indicating a user that is logged into the robot; determining location permissions associated with the user; and causing, based on the location permissions associated with the user, the robot to skip a second location of the plurality of locations.

14. The method of any of the preceding embodiments, wherein the server is configured to perform operations comprising: receiving, from the sensor system, the first plurality of images; determining, based on inputting the first plurality of images into a machine learning model, that there is no gas leak at the first location; and in response to determining that there is no gas leak at the first location, sending an indication that no gas leak was detected in the first plurality of images and a request to record a second plurality of images of the first location.

15. The method of any of the preceding embodiments, wherein the instructions, when executed, cause the one or more processors to perform operations further comprising: in response to receiving the request, recording a second plurality of images of the first location; determining, based on the second plurality of images, that there is no gas leak at the first location; and in response to determining that there is no gas leak at the first location, causing the robot to move to a second location of the plurality of locations.

16. The method of any of the preceding embodiments, further comprising: in response to receiving the request, causing the robot to move closer to the first location; recording a second plurality of images of the first location; and sending the second plurality of images to the server.

17. The method of any of the preceding embodiments, wherein the server performs operations comprising: obtaining the inspection path information; obtaining location information corresponding to a plurality of robots, wherein the plurality of robots comprises the robot; determining, based on the location information, that the robot is closer to the first location than other robots of the plurality of robots; and in response to determining that the robot is closer to the first location than other robots of the plurality of robots, sending the inspection path information to the robot.

18. The method of any of the preceding embodiments, wherein the robot is configured to perform operations comprising: determining that more than a threshold amount of time has transpired since receiving a heartbeat message from the sensor system; and in response to determining that more than a threshold amount of time has transpired, sending a request to the server, wherein the request indicates a diagnostic procedure for the server to perform on the sensor system.

19. The method of any of the preceding embodiments, wherein the robot is configured to perform operations comprising: determining that more than a threshold amount of time has transpired since receiving a heartbeat message from the sensor system; and in response to determining that more than a threshold amount of time has transpired, moving to a charging station associated with the robot.

20. A tangible, non-transitory, machine-readable medium storing instructions that, when executed by a data processing apparatus, cause the data processing apparatus to perform operations comprising those of any of embodiments 1-19.

21. A system comprising: one or more processors; and memory storing instructions that, when executed by the processors, cause the processors to effectuate operations comprising those of any of embodiments 1-19.

22. A system comprising means for performing any of embodiments 1-19.

The above-described embodiments of the present disclosure are presented for purposes of illustration and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A tangible, non-transitory, machine-readable medium storing instructions that when executed by one or more processors effectuate operations comprising:

obtaining inspection path information, indicating a path for a robot to travel, and a plurality of locations along the path to inspect with a sensor system, wherein each location of the plurality of locations is associated with orientation information indicating an orientation that an RGB camera and an OGI camera is to be placed in to record a video;

causing the robot to move along the path;

determining, based on information received via a location sensor, that the robot is at a first location of the plurality of locations;

in response to determining that the robot is at the first location, causing the robot to adjust the OGI camera based on first orientation information associated with the first location;

receiving, from the robot, an indication that an orientation of the OGI camera matches the first orientation information;

recording a first video with the OGI camera and a second video with the RGB camera; and sending the first video and the second video to a server.

2. A robot system for patrolling a facility and detecting gas leaks, the robot system comprising:

a server;

a robot; and a sensor system configured to be attached to a robot and image gas leaks at a facility, the sensor system comprising:

a location sensor;

an optical gas imaging (OGI) camera;

a red green blue (RGB) camera, wherein the RGB camera is located such that a field of view of the RGB camera overlaps a field of view of the OGI camera; and one or more processors and computer program instructions that, when executed by the one or more processors, effectuate operations comprising:

obtaining inspection path information, indicating a path for the robot to travel, and a plurality of locations along the path to inspect with the sensor system, wherein each location of the plurality of locations is associated with orientation information indicating an orientation that the RGB camera and the OGI camera is to be placed in to record a video;

causing the robot to move along the path;

determining, based on information received via the location sensor, that the robot is at a first location of the plurality of locations;

in response to determining that the robot is at the first location, causing the robot to adjust the OGI camera based on first orientation information associated with the first location;

receiving, from the robot, an indication that an orientation of the OGI camera matches the first orientation information;

recording a first video with the OGI camera and a second video with the RGB camera; and sending the first video and the second video to the server.

3. The robot system of claim 2, wherein the instructions, when executed, cause the one or more processors to perform operations further comprising:

receiving, from the server, a message indicating that the first video and the second video do not indicate a gas leak; and in response to receiving the message, causing the robot to move to a second location of the plurality of locations.

4. The robot system of claim 2, wherein the instructions, when executed, cause the one or more processors to perform operations further comprising:
receiving information indicating a battery level of the robot;
determining, based on the information indicating a battery level of the robot, that the battery level of the robot satisfies a threshold;
determining that one or more locations of the plurality of locations along the path have yet to be recorded; and
in response to determining that the battery level of the robot satisfies the threshold and that one or more locations of the plurality of locations along the path have yet to be recorded, causing the sensor system to stop receiving energy from a battery of the robot and begin receiving energy from a battery of the sensor system.

5. The robot system of claim 2, wherein the OGI camera comprises an indium antimonide detector, and wherein the field of view of the RGB camera encompasses the field of view of the OGI camera.

6. The robot system of claim 2, wherein the OGI camera comprises a quantum well infrared photodetector.

7. The robot system of claim 2, wherein causing the robot to adjust the OGI camera based on first orientation information associated with the first location comprises:
sending, to the robot, a request for pose information associated with the robot;
in response to sending the request, receiving pose information indicating a pose of the robot relative to the first location of the plurality of locations; and
adjusting, based on the pose information, a position of the sensor system such that the OGI camera is facing the first location.

8. The robot system of claim 2, wherein the inspection path information is associated with a first map obtained by the robot, wherein the instructions, when executed, cause the one or more processors to perform operations further comprising:
receiving, from the robot, navigation information indicating that the robot is lost, wherein the navigation information is generated based on a determination that an environment surrounding the robot does not match the first map; and
in response to receiving the navigation information, sending a second map with an indication of each location of the plurality of locations to the robot.

9. The robot system of claim 8, wherein the operations further comprise:
determining, based on an image received from the robot, the second map from a plurality of maps corresponding to the facility.

10. The robot system of claim 2, wherein the inspection path information is associated with a first map obtained by the robot, wherein the first map indicates one or more objects in the facility, wherein the instructions, when executed, cause the one or more processors to perform operations further comprising:
receiving, from the robot, an image of an environment surrounding the robot and navigation information indicating that the robot is lost, wherein the navigation information is generated based on a determination that an environment surrounding the robot does not match the first map; and in response to determining that the image does not correspond to any map of a plurality of maps associated with the facility, causing the robot to generate a new map of the facility.

11. The robot system of claim 2, wherein the first orientation information comprises a vector indicating a roll of the robot, a pitch of the robot, and a yaw of the robot or a component of the robot.

12. The robot system of claim 2, wherein causing the robot to move along the path comprises:
receiving information indicating a user that is logged into the robot;
determining location permissions associated with the user; and
causing, based on the location permissions associated with the user, the robot to skip a second location of the plurality of locations.

13. The robot system of claim 2, wherein the robot is configured to perform operations comprising:
determining that more than a threshold amount of time has transpired since receiving a heartbeat message from the sensor system; and
in response to determining that more than a threshold amount of time has transpired, moving the robot to a charging station associated with the robot.

14. The robot system of claim 2, wherein the robot is configured to perform operations comprising:
determining that more than a threshold amount of time has transpired since receiving a heartbeat message from the sensor system; and
in response to determining that more than a threshold amount of time has transpired, sending a request to the server, wherein the request indicates a diagnostic procedure the server is to perform on the sensor system.

15. The robot system of claim 2, wherein causing the robot to adjust the OGI camera based on first orientation information associated with the first location comprises:
determining that a first portion of an object at the first location has been recorded by the OGI camera; and
in response to determining that a first portion of an object at the first location has been recorded, causing the robot to move so that a second portion of the object is within a field of field of view of the OGI camera.

16. The robot system of claim 2, wherein the server is configured to perform operations comprising:
receiving the first video and the second video;
determining that the first video indicates a gas leak; and
in response to determining that the first video indicates a gas leak, causing the sensor system to record an additional video with the OGI camera at the first location.

17. The robot system of claim 2, wherein the server is configured to perform operations comprising:
receiving, from the sensor system, the first video;
determining, based on inputting the first video into a machine learning model, that there is no gas leak at the first location; and
in response to determining that there is no gas leak at the first location, sending an indication that no gas leak was detected in the first video to the sensor system and a request indicating that the robot should move to a second location of the plurality of locations.

18. The robot system of claim 2, wherein the server is configured to perform operations comprising:
obtaining the inspection path information;
obtaining location information corresponding to a plurality of robots, wherein the plurality of robots comprises the robot;

determining, based on the location information, that the robot is closer to the first location than other robots of the plurality of robots; and in response to determining that the robot is closer to the first location than other robots of the plurality of robots, sending the inspection path information to the robot.

19. The robot system of claim 18, wherein sending the inspection path information to the robot is performed in response to receiving information indicating that a temperature of the sensor system is between a threshold range of temperatures.

20. The robot system of claim 18, wherein sending the inspection path information to the robot is performed in response to receiving information indicating that a battery level of the robot is above a threshold battery level.

21. The robot system of claim 2, wherein the operations comprise steps for determining whether an image depicts a gas leak.

22. The robot system of claim 2, wherein the operations comprise steps for detecting gas leaks in a facility.

* * * * *